(12) United States Patent
Fukushima et al.

(10) Patent No.: US 8,144,206 B2
(45) Date of Patent: Mar. 27, 2012

(54) IMAGING APPARATUS ADAPTED TO PERFORM NORMAL IMAGING AND HIGH-SPEED IMAGING

(75) Inventors: Yasushi Fukushima, Osaka (JP); Tadami Mine, Osaka (JP)

(73) Assignee: Panasonic Corporation, Osaka (JP)

( * ) Notice: Subject to any disclaimer, the term of this patent is extended or adjusted under 35 U.S.C. 154(b) by 358 days.

(21) Appl. No.: 12/279,603

(22) PCT Filed: Feb. 15, 2007

(86) PCT No.: PCT/JP2007/052716
§ 371 (c)(1),
(2), (4) Date: Aug. 15, 2008

(87) PCT Pub. No.: WO2007/094403
PCT Pub. Date: Aug. 23, 2007

(65) Prior Publication Data
US 2010/0220214 A1    Sep. 2, 2010

(30) Foreign Application Priority Data
Feb. 17, 2006   (JP) .................................. 2006-040553

(51) Int. Cl.
*H04N 5/235* (2006.01)
*H04N 5/228* (2006.01)
*H04N 5/225* (2006.01)
*H04N 9/09* (2006.01)
*H04N 9/097* (2006.01)

(52) U.S. Cl. .................... 348/222.1; 348/220.1; 348/262

(58) Field of Classification Search .................. 348/262, 348/264, 265, 220.1, 235, 234, 222.1
See application file for complete search history.

(56) References Cited

U.S. PATENT DOCUMENTS

| | | | | |
|---|---|---|---|---|
| 2,677,721 | A | * | 5/1954 | Bedford ........................ 348/494 |
| 5,349,381 | A | * | 9/1994 | Murayama et al. ........... 348/252 |
| 5,471,323 | A | * | 11/1995 | Suetsugi et al. ............... 358/511 |

(Continued)

FOREIGN PATENT DOCUMENTS
JP    8-47491    2/1996
(Continued)

OTHER PUBLICATIONS

International Search Report issued May 1, 2007 in International (PCT) Application No. PCT/JP2007/052716.

(Continued)

*Primary Examiner* — Nicholas Giles
(74) *Attorney, Agent, or Firm* — Wenderoth Lind & Ponack, L.L.P.

(57) ABSTRACT

An imaging apparatus includes an imaging unit having a discrete pixel structure that outputs directly signals of respective M sample points corresponding to M pixels per single frame for normal imaging and imaging at a first frame rate. The imaging unit adds signals of respective N pixels out of M pixels per single frame and outputs signals of M/N sample points (M and N are integers equal to or greater than 2) at each frame for high-speed imaging and imaging at a second frame rate greater than the first frame rate. An operation unit outputs directly output signals from the imaging unit for normal imaging and performs interpolation operations on the output signals from the imaging unit for interpolating signals of the (N−1) sample points between respective sample points to output interpolated signals of the M sample points for high-speed imaging.

8 Claims, 17 Drawing Sheets

U.S. PATENT DOCUMENTS

| | | | |
|---|---|---|---|
| 5,661,522 A * | 8/1997 | Tomizuka | 348/262 |
| 5,912,702 A * | 6/1999 | Sudo | 348/234 |
| 6,661,451 B1 * | 12/2003 | Kijima et al. | 348/220.1 |
| 7,233,355 B2 * | 6/2007 | Kameyama et al. | 348/317 |
| 7,570,286 B2 * | 8/2009 | Koike et al. | 348/235 |
| 2003/0174225 A1 * | 9/2003 | Kameyama et al. | 348/272 |
| 2003/0193580 A1 | 10/2003 | Okamoto | |
| 2003/0227552 A1 | 12/2003 | Watanabe | |
| 2004/0036800 A1 * | 2/2004 | Ohki | 348/459 |
| 2004/0109060 A1 | 6/2004 | Ishii | |
| 2004/0212689 A1 | 10/2004 | Nakajima et al. | |
| 2005/0052553 A1 | 3/2005 | Kido et al. | |

FOREIGN PATENT DOCUMENTS

| | | |
|---|---|---|
| JP | 11-32241 | 2/1999 |
| JP | 2000-295531 | 10/2000 |
| JP | 2003-69903 | 3/2003 |
| JP | 2003-116143 | 4/2003 |
| JP | 2003-283907 | 10/2003 |
| JP | 2003-299112 | 10/2003 |
| JP | 2003-338988 | 11/2003 |
| JP | 2004-32100 | 1/2004 |
| JP | 2004-146904 | 5/2004 |
| JP | 2005-86499 | 3/2005 |
| JP | 2005-303519 | 10/2005 |

OTHER PUBLICATIONS

International Preliminary Report on Patentability issued Aug. 28, 2008 in the International (PCT) Application No. PCT/JP2007/052716.

* cited by examiner

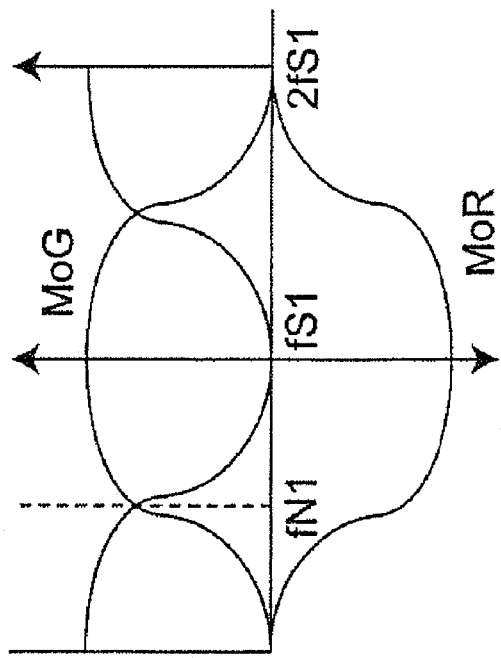
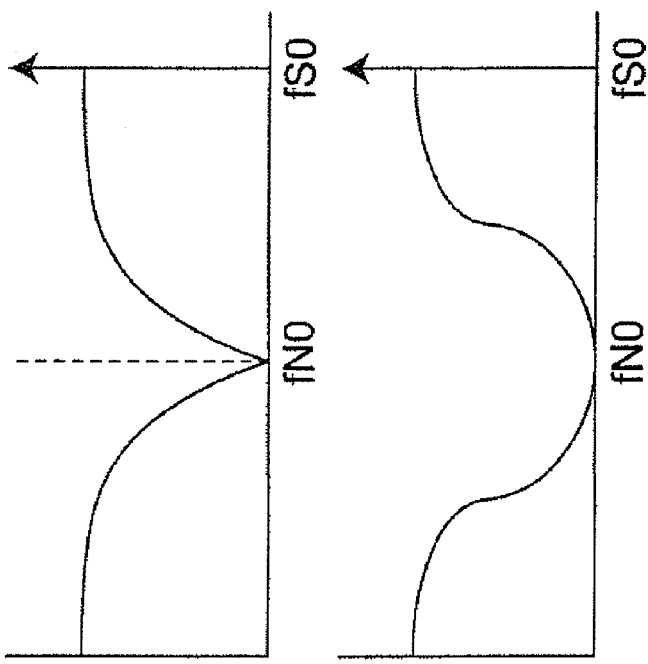
Fig. 4C
Fig. 4A
Fig. 4B

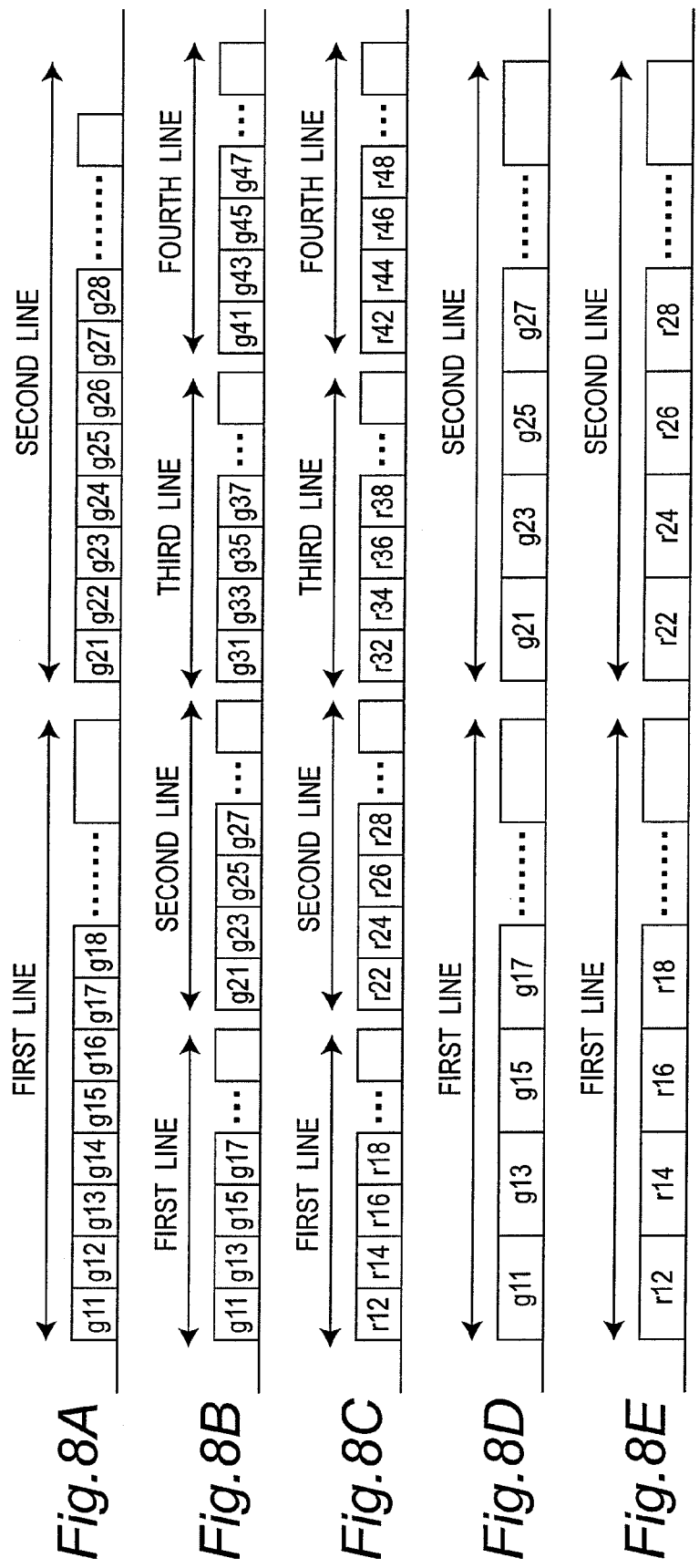

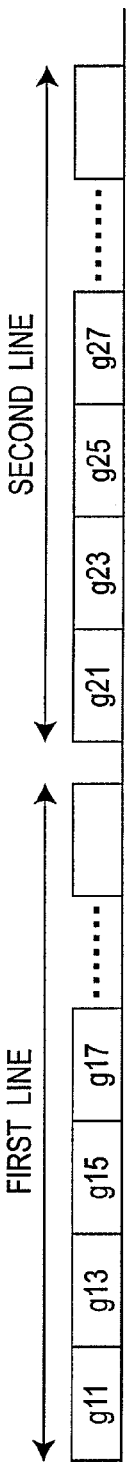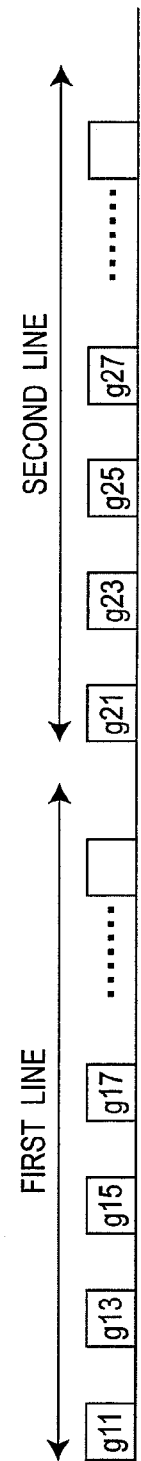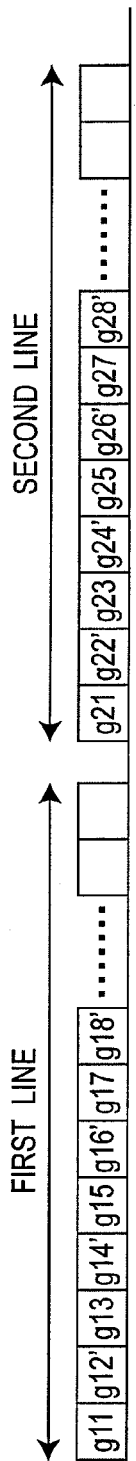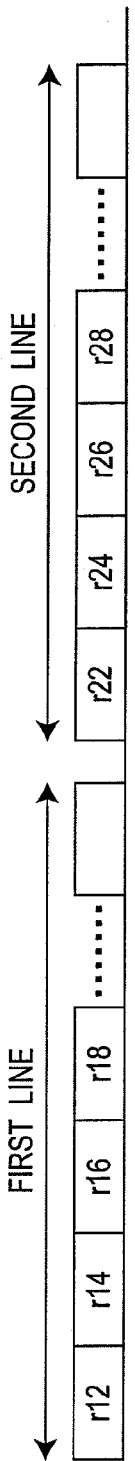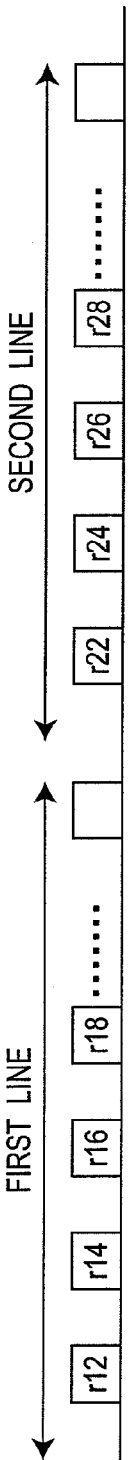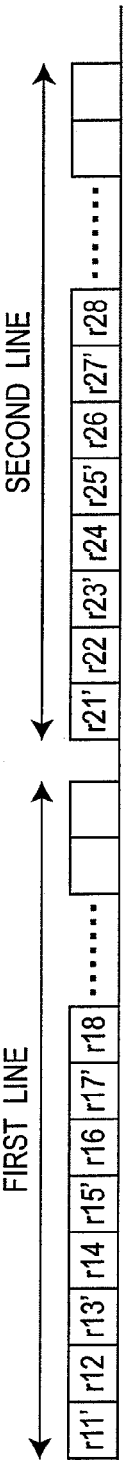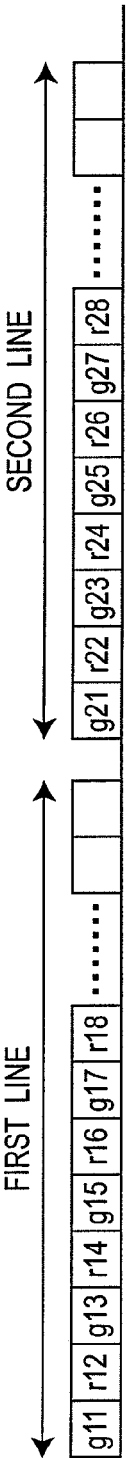

Fig.17

HORIZONTAL DIRECTION →

G1ch IMAGING ELEMENT gf11 gf12 gf13 gf14 gf15 gf16

G2ch IMAGING ELEMENT gs11 gs12 gs13 gs14 gs15 gs16

Bch IMAGING ELEMENT b11 b12 b13 b14 b15 b16

Rch IMAGING ELEMENT r11 r12 r13 r14 r15 r16

IMAGING APPARATUS ADAPTED TO PERFORM NORMAL IMAGING AND HIGH-SPEED IMAGING

BACKGROUND OF THE INVENTION

1. Technical Field

The present invention relates to a high-speed imaging apparatus such as a video camera which is capable of slow-motion playback.

2. Background Art

In recent years, video cameras have been increasingly having higher performance and particularly have been enabled to perform slow-motion shooting for capturing images at speeds higher than normal speeds along with the development of digital technologies. Particularly, in cases of broadcasting sports program, beautiful slow-motion playback pictures are a significant strong point in program production.

For capturing images at higher speeds, there is a need for providing signals having a frequency range corresponding to multiples of the speed of conventional standard video signals. Namely, for capturing images at a treble speed in order to perform ⅓-slow playback, there is a need for a treble frame rate in outputting from a camera, thereby requiring a data rate which is three times a normal data rate. Namely, the camera is required to output data in a different format from those of normal video signals at a treble speed, and there is also a need for a transfer device dedicated to high-speed imaging in order to transfer such signals.

As a method for overcoming the problem, Japanese Patent Laid-open Publication No. 11-32241 (pages 3 to 5) discloses a camera apparatus, for example. FIG. 20 is a block diagram illustrating the structure of the camera apparatus. In the camera apparatus, a CCD imaging unit 101 employs a CCD (Charge Coupled Device) image sensors as a solid-state imaging element which performs photoelectric conversion. In the CCD imaging unit 101, a transfer unit 102 transfers charges at a driving speed fc, and imaging output signals therefrom are subjected to A/D conversion and then are accumulated in a field memory 103.

In the case of capturing images at a treble speed by the camera apparatus, namely in the case of n=3, the transfer unit 102 drives the CCD imaging unit 101 at a driving speed 3 fc which is three times a normal driving speed, and output signals therefrom are subjected to A/D conversion at a sampling frequency 3 fc which is three times a normal sampling frequency. The imaging signals having the treble speed are stored at #1 to #3 in the field memory 103. Further, the imaging unit 101, the transfer unit 102 and the field memory 103 operate on receiving control signals from a control circuit 105.

While the image signals are written into the field memory 103 at the clock frequency 3 fc, the contents of the field memory are read out therefrom at a normal clock frequency fc in parallel thereto, then are attenuated to ⅓ by 1/n attenuators 106 and are transferred to an adder 107. Accordingly, the adder 107 outputs the average value of the contents of #1 to #3 in the field memory 3 at a normal speed.

During capturing images at a normal speed, the contact point in a signal switcher (selector) 108 comes into contact with a side a, so that signals are directly extracted from the transfer unit 102 in the CCD and transferred to a camera signal processing circuit 109. On the other hand, during high-speed imaging and during low-speed photographing, the contact point comes into contact with a side b, so that outputs from the adder 107 are transferred to the camera signal processing circuit 109. The signals which have been processed by the camera signal processing circuit 109 are transferred to subsequent circuits which perform recording and monitoring thereof according to well-known methods.

Further, in order to enable playbacking signals created by photographing at a high-speed later at a normal speed, the image signals are written into a buffer memory 104 at a higher speed. Subsequently, the photographing is stopped or image signals which have been stored in the buffer memory 104 at this time are read out therefrom at the normal speed, instead of signals being created by photographing.

SUMMARY OF THE INVENTION

With the above-described technique, during high-speed imaging, the field memory or the buffer memory and the circuits subsequent thereto can be operated at a normal speed, but the portions from the CCD imaging unit to the memory are required to be operated at higher speeds. However, particularly, in operating portion from the solid-state imaging element such as a CCD to the memory, it is significantly difficult to operate them at a data rate greater than a normal data rate.

It is an object of the present invention to provide an imaging apparatus capable of providing images with a high data rate which can be playbacked in slow motion at a normal data rate, without increasing the data rate when writing into a memory during high-speed imaging.

An imaging apparatus according to the present invention includes: an imaging unit having a discrete pixel structure, the imaging unit being adapted to output directly signals of respective M sample points corresponding to M pixels per single frame in normal imaging for imaging at a first frame rate, and being adapted to add signals of respective N pixels out of M pixels per single frame and output signals of M/N sample points (M and N are integers equal to or greater than 2) in high-speed imaging for imaging at a second frame rate greater than the first frame rate; and an operation unit being adapted to output directly output signals from the imaging unit in the normal imaging, and being adapted to perform interpolation operations on the output signals from the imaging unit for interpolating signals of (N−1) sample points between respective sample points and output interpolated signals of the M sample points in the high-speed imaging.

Preferably the imaging unit includes at least a first solid-state imaging element having a discrete pixel structure and a second solid-state imaging element having a discrete pixel structure, the first solid-state imaging element and the second solid-state imaging element have pixels corresponding to each other, and combinations of N pixels to be added by the first solid-state imaging element are different from combinations of N pixels to be added by the second solid-state imaging element in the high-speed imaging.

In the interpolation operations, the operation unit may perform: creating first interpolated low-frequency components from output signals of sample points from the first solid-state imaging element, creating second interpolated low-frequency components from output signals of sample points from the second solid-state imaging element, adding the output signals of the sample points from the first solid-state imaging element and the output signals of the sample points from the second solid-state imaging element and creating high-frequency components of the added signals, adding the first low-frequency components and the high-frequency components to provide signals for the first solid-state imaging element, and adding the second low-frequency components and the high-frequency components to provide signals for the second solid-state imaging element.

Further, in the interpolation operations, the operation unit may perform: inserting signals having a value of zero (0) to the output signals of the M/N sample points from the first solid-state imaging element at the (N−1) sample points between signals to cause the entire signals to correspond to the M sample points, inserting signals having a value of zero (0) to the output signals of the M/N sample points from the second solid-state imaging element at the (N−1) sample points between signals in such a way that the sample points corresponding to non-zero (0) signals are different from the output signals from the first solid-state imaging element to cause the entire signals to correspond to the M sample points, creating first interpolated low-frequency components from the signals of the first solid-state imaging element, creating second interpolated low-frequency components from the signals of the second solid-state imaging element, adding the output signals from the first solid-state imaging element and the output signals from the second solid-state imaging element at sample points corresponding to each other, and creating high-frequency components of the added signals, adding the first low-frequency components and the high-frequency components to provide signals for the first solid-state imaging element, and adding the second low-frequency components and the high-frequency components to provide signals for the second solid-state imaging element.

The imaging unit may further include a third solid-state imaging element having a discrete pixel structure and having pixels corresponding to the respective pixels in the first and second solid-state imaging elements. In this case, in the interpolation operations, the operation unit may perform: creating third interpolated low-frequency components from output signals of the sample points from the third solid-state imaging elements, adding the output signals of the sample points from the first solid-state imaging element and the output signals of the sample points from the second solid-state imaging element, and creating high-frequency components of the added signals, and adding the third low-frequency components and the high-frequency components to provide signals for the third solid-state imaging element.

The imaging unit may further include a third solid-state imaging element having a discrete pixel structure and having pixels corresponding to the respective pixels in the first and second solid-state imaging elements. In this case, in the interpolation operations, the operation unit may perform: inserting signals having a value of zero (0) to the output signals of the M/N sample points from the first solid-state imaging element at the (N−1) sample points between signals to cause the entire signals to correspond to the M sample points, inserting signals having a value of zero (0) to the output signals of the M/N sample points from the second solid-state imaging element at the (N−1) sample points between signals in such a way that the sample points corresponding to non-zero (0) signals are different from the output signals from the first solid-state imaging element to cause the entire signals to correspond to the M sample points, inserting signals having a value of zero (0) to the output signals of the M/N sample points from the third solid-state imaging element at the (N−1) sample points between signals in such a way that the signals having the zero (0) value correspond to the output signals of the sample points from the first solid-state imaging element to cause the entire signals to correspond to the M sample points, creating third interpolated low-frequency components from the signals of the third solid-state imaging element, adding the output signals from the first solid-state imaging element and the output signals from the second solid-state imaging element at sample points corresponding to each other, and creating high-frequency components of the added signals, and adding the third low-frequency components and the high-frequency components to provide signals for the third solid-state imaging element.

The imaging unit may include first to third solid-state imaging elements corresponding to G, B and R channels, respectively.

The imaging unit includes first and second solid-state imaging elements corresponding to G1 and G2 channels provided by dividing a G channel into two channels, a third solid-state imaging element corresponding to a B channel, and a fourth solid-state imaging element corresponding to an R channel, in the normal imaging, output signals from the first and second solid-state imaging elements corresponding to the G1 channel and the G2 channel are added to provide signals for the G channel, and in the high-speed imaging, output signals from the first solid-state imaging elements and output signals from the second solid-state imaging element at sample points corresponding to each other are added to provide signals for the G channel.

The imaging apparatus may further includes between the imaging unit and the operation unit a storage unit for storing output signals from the imaging unit and for outputting the stored output signals to the operation unit. In this case, the operation unit may perform operations on the output signals from the storage unit.

Further, the imaging unit may output a frame rate greater than a frame rate output from the storage unit.

As described above, with the present invention, during high-speed imaging, it is possible to maintain the data rate equivalent to a normal data rate, while increasing the frame rate in outputting from the imaging unit. This can offer the excellent advantage of providing slow-motion playbacked images, without requiring operations at higher data rates.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 4A is a schematic view illustrating the relationship between frequencies and signals before pixel addition, FIG. 4B is a schematic view illustrating the relationship between frequencies and signals after pixel addition, and FIG. 4C a schematic view illustrating aliasing components canceled through addition of signals for G and R channels for which different combinations of pixels to be added are defined;

FIG. 8A is a schematic view illustrating signals of pixels for the G channel in normal imaging, FIG. 8B is a schematic view illustrating signals resulted from pixel addition for the G channel in high-speed imaging, FIG. 8C is a schematic view illustrating signals resulted from pixel addition for the B channel in high-speed imaging, FIG. 8D is a schematic view illustrating slow-playbacking signals for the G channel in slow playbacking, and FIG. 8E is a schematic view illustrating slow-playbacking signals for the B channel in slow playbacking;

FIGS. 9A to 9G are schematic views illustrating pixels in respective steps in interpolation operations;

FIG. 17 is a schematic view illustrating a method for reducing, by half, the number of sample points, as an example different from FIG. 15;

DETAILED DESCRIPTION OF THE INVENTION

Figure 1:
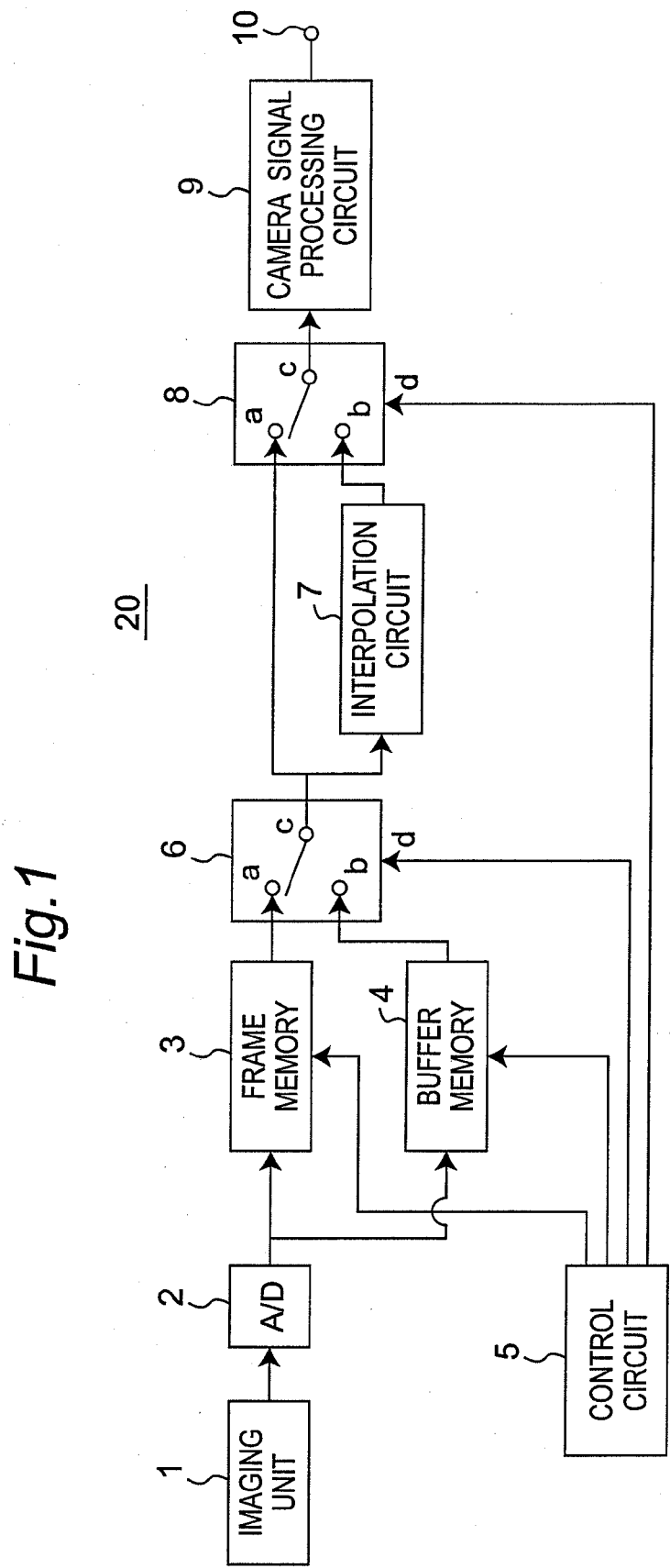
FIG. 1 is a block diagram illustrating the structure of an imaging apparatus according to a first embodiment of the present invention.

Hereinafter, imaging apparatus according to embodiments of the present invention will be described, with reference to the attached drawings. In the drawings, like reference characters designate substantially the same components.

First Embodiment

FIG. 1 is a block diagram illustrating the structure of an imaging apparatus 20 according to a first embodiment of the present invention. The imaging apparatus 20 includes an imaging unit 1, an A/D converter 2, a frame memory 3, a buffer memory 4, a control circuit 5, a selector 6, an interpolation circuit 7, a selector 8, a camera signal processing circuit 9, and an output terminal 10.

Figure 2:
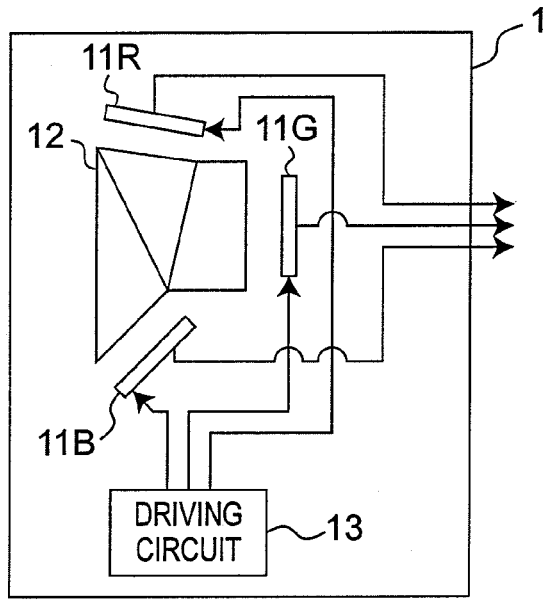
FIG. 2 is a block diagram illustrating the structure of an imaging unit in the imaging apparatus of FIG. 1.

FIG. 2 is a schematic view illustrating the structure of the imaging unit 1, in detail. The imaging unit 1 converts optical image signals into electrical signals and outputs the electrical signals. The imaging system thereof is a three-sensor system using three solid-state imaging elements 11G, 11B and 11R.

The imaging unit 1 divides, through an optical prism 12, light inputted from a lens (not illustrated) into components having three colors of green (G), blue (B) and red (R). Further, the solid-state imaging elements 11G, 11B and 11R correspond to G, B and R channels, respectively, and are, for example, CCD image sensors. The solid-state imaging elements 11G, 11B and 11R have a discrete pixel structure and spatially sample the pixels and convert them into electrical signals. Further, the solid-state imaging elements 11G, 11B and 11R are driven by a driving circuit 13.

Figure 3:
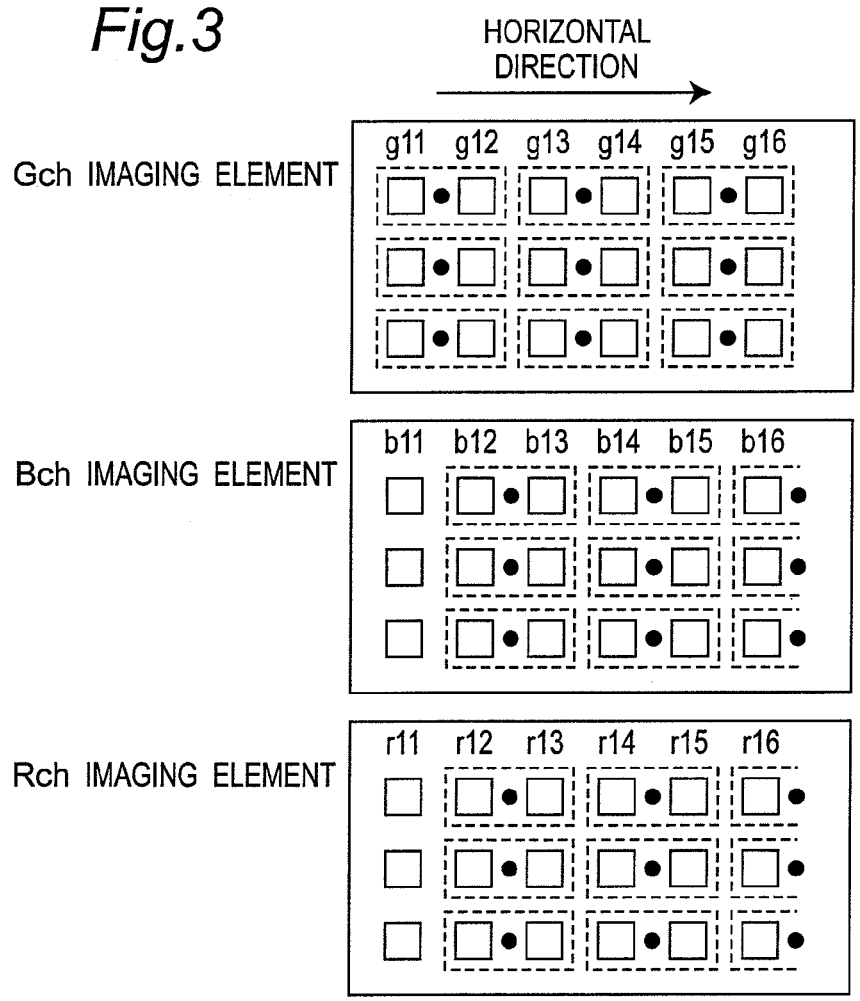
FIG. 3 is a schematic view illustrating the combinations of pixels to be added in three solid-state imaging elements in the imaging unit of FIG. 2.

FIG. 3 is a schematic view illustrating a 2-dimensional placement of pixels to be subjected to photoelectric conversion by the solid-state imaging elements 11G, 11B and 11R. While the solid-state imaging elements 11G, 11B and 11R are placed separately from one another, a pixel g11 in the solid-state imaging element 11G, a pixel b11 in the solid-state imaging element 11B and a pixel r11 in the solid-state imaging element 11R correspond to optically the same position. Namely, the pixels g11, b11 and r11 correspond to spatially the same sample point.

The A/D converter 2 converts analog image signals output from the imaging unit 1 into digital imaging signals and inputs the digital signals to the frame memory 3 and the buffer memory 4. The outputs of the frame memory 3 and the buffer memory 4 are connected to the selector 6. Further, the control circuit 5 controls the selectors 6 and 8. The interpolation circuit 7 is provided between the output c of the selector 6 and a contact point b of the selector 8. The interpolation circuit 7 interpolates, through interpolation operations, sample points corresponding to absent pixels resulted from pixel addition to provide a number of sample points equal to the original number of pixels. The output c of the selector 8 is supplied to the camera signal processing circuit 9. The camera signal processing circuit 9 performs signal processing required for a normal camera, such as offset adjustment, gain adjustment, gamma correction and detail enhancement, and outputs image signals in a standard form which is recordable and displayable.

<Operations for Normal Imaging at Normal Speed>

In imaging at a normal speed, the control circuit 5 selects input signals from the contact points a in the selectors 6 and 8, so that the input signals are output from the respective contact points c. Thus, output signals from the frame memory 3 are supplied to the camera signal processing circuit 9 through the selector 6 and the selector 8. Also, during imaging at a normal speed, it is possible to bypass the frame memory 3, if there is no need for using the frame memory 3.

Next, there will be described cases of performing high-speed imaging at a speed rate of ½ for slow-motion images, namely at a double speed, regarding operations during high-speed imaging, monitoring and slow playbacking, for example. Further, the operations for high-speed imaging relate to operations until writing signals from the imaging unit 1 into the memories 3 and 4. The operations for monitoring relate to operations for monitoring at a reduced frame rate, namely at the same frame rate as a normal frame rate. The operations for slow playbacking relate to operations until outputting of slow playback signals through the interpolation circuit 7.

<Operations for High-Speed Imaging at High Speed>

In high-speed imaging at a double speed, image signals having 120 frames per second and thus having a higher speed than that of normal image signals having 60 frames per second are output from the imaging unit 1. The A/D converter 2 converts the analog imaging signals into digital imaging signals and, then, the digital imaging signals are written to the frame memory 3 and the buffer memory 4. The frame memory 3 is used for monitoring during photographing, while the buffer memory 4 is used for buffering for slow playbacking. Further, since the buffer memory 4 is a memory for storing large amounts of information obtained by high-speed imaging in order to prevent the information from being lost, the buffer memory 4 is not required to be a memory which enables writing thereto and reading therefrom concurrently, and can be a memory which enables only writing information thereto.

<Operations for Monitoring>

While image signals having 120 frames per second are written into the frame memory 3, signals having only 60 frames per second, out of them, are read out, during monitoring. Further, the control circuit 5 selects input signals from the contact points a in the selectors 6 and 8, so that the input signals are output from the contact point c. Namely, image signals having 60 frames per second are supplied to the camera signal processing circuit 9, similarly to during normal imaging, and are used for displaying signals on, for example, a view finder. Further, the contact point b in the selector 8 can be selected, in order to use, as monitoring signals, output signals from the interpolation circuit 7, which will be described later.

<Operations for Slow Playbacking>

Figure 6A:
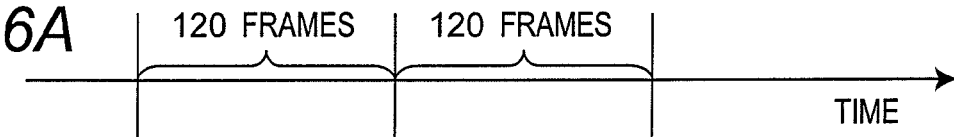
FIG. 6A is a schematic view illustrating the relationship between the time for outputting from the imaging unit and the number of frames.
Figure 6B:
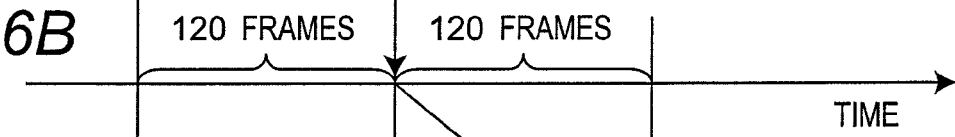
FIG. 6B is a schematic view illustrating the relationship between the time for writing into a memory and the number of frames.
Figure 6C:
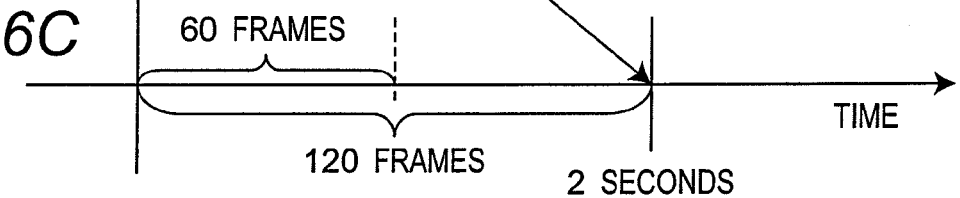
FIG. 6C is a schematic view illustrating the relationship between the time for slow-playbacking and the number of frames.

FIGS. 6A to 6C are schematic views illustrating the relationship among the numbers of frames per unit time during outputting from the imaging unit 1 as shown in FIG. 6A, during writing into the buffer memory 4 as shown in FIG. 6B, and during slow playbacking as shown in FIG. 6C. Operations for slow playbacking will be described with reference to FIGS. 6A to 6C. During outputting from the imaging unit 1 and during writing into the memory 4, the frame rate is 120 frames per second. On the other hand, as illustrated in FIG. 6C, slow playbacking is performed by slowly reading image signals which have been written into the buffer memory 4. Namely, although imaging signals having 120 frames per second have been written into the buffer memory 4, 60 frames are read out therefrom per second by taking a double time, during slow-motion playback. The playback signals from the buffer memory 4 are supplied to the camera signal processing circuit 9 through the selector 6 which applies various signal processing thereto and output them from the output terminal 10 as slow playback signals. Since 120 frames corresponding to 1 second are output by taking 2 seconds, slow playbacking can be performed. On the other hand, playbacking is performed at a frame rate of 60 frames per second which is a normal speed, thus realizing smooth and beautiful slow-play-backed images.

<Pixel Addition>

In performing high-speed imaging, the solid-state imaging elements 11G, 11B and 11R in the imaging unit 1 add the signal charges at plural pixels and outputs the added signal charges. For example, by adding the signal charges at horizontal two pixels, it is possible to halve the number of pixels output from the imaging elements, which can halve the time required for outputting them, even when the imaging elements are driven through the same driving clock speed as a usual driving clock. Namely, even if the frame rate is doubled, it is possible to maintain the data rate of signals from the solid-state imaging elements 11G, 11B and 11R at the same data rate, since the number of pixels per frame can be reduced by half. Namely, during high-speed imaging, image signals which are written into the frame memory 3 and the buffer memory 4 can have the same pixel rate as that in normal imaging while having a double frame rate.

Figure 7A:
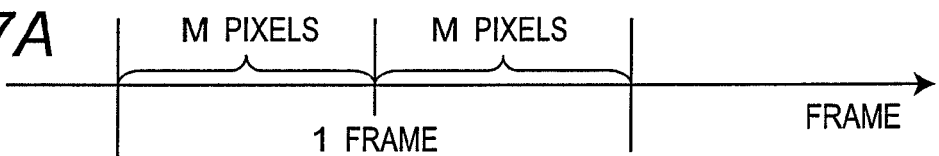
FIG. 7A is a schematic view illustrating the relationship between each frame and the number of pixels per frame in normal imaging.
Figure 7B:
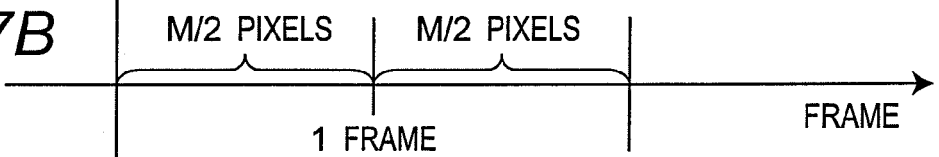
FIG. 7B is a schematic view illustrating the relationship between each frame and the number of pixels per frame in high-speed imaging.
Figure 7C:
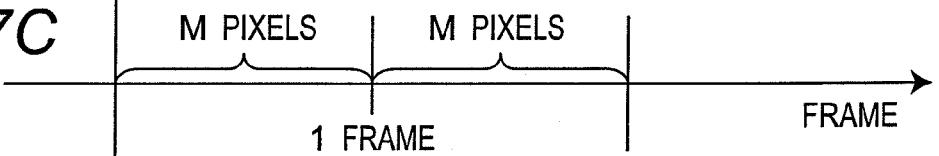
FIG. 7C is a schematic view illustrating the relationship between each frame and the number of pixels per frame in outputting from the interpolation circuit.

Next, with reference to FIGS. 7A to 7C, there will be described the changes of the number of pixels per single frame which are caused by pixel addition and interpolation processing. FIG. 7A is a schematic view illustrating the relationship between the number of pixels and each frame, during normal imaging. FIG. 7B is a schematic view illustrating the relationship between the number of pixels and each frame during writing into the memory in high-speed imaging. FIG. 7C is a schematic view illustrating the relationship between the number of pixels and each frame, during outputting from the interpolation circuit. In high-speed imaging, the number of pixels per single frame is made ½ of that during normal imaging (FIG. 7A), through pixel addition, as illustrated in FIG. 7B, thereby reducing the data rate. Further, the number of pixels per single frame can be made equal to that during normal imaging, as illustrated in FIG. 7C, through the subsequent interpolation processing.

In order to add the signal charges at two pixels adjacent to each other horizontally, pulses are applied to the last electrode in the horizontal CCD and reset pulses are applied to the reset gate electrode therein at timings corresponding to a period which is twice the period of driving pulses applied to the transfer electrodes in the horizontal CCD. While the period of driving pulses applied to the transfer electrodes in the horizontal CCD is equal to the period thereof in the case of individually outputting the signal charge at each single pixel, the periods of pulses applied to the last electrode and pulses applied to the reset gate electrode are set to be twice the period thereof in the case of outputting individual signal charges. Thus, signal charges transferred through the CCD are output, after signal charges at two adjacent pixels are added at the last electrode. Further, such pixel addition is described in detail in, for example, Japanese Patent Laid-open Publication No. 2000-174253.

Further, the number of samples of written image signals is ½ of the normal number of samples and, therefore, signals are output at a rate of once per two clocks, in reading out signals from the frame memory 3 and the buffer memory 4. The output signals are subjected to interpolation operations by the interpolation circuit 7 so that sample points corresponding to the absent pixels are created, thereby offering a number of sample points corresponding to the same number of pixels as the normal number of pixels. The control circuit 5 selects input signals from the contact point b in the selector 8, so that the input signals are output from the contact point c and then are subjected to various signal processing by the camera signal processing circuit 9.

Namely, during high-speed imaging, the output signals from the frame memory 3 are subjected to interpolation processing by the interpolation circuit 7 so that the output signals are changed to signals to be supplied to the view finder (not illustrated). During slow playbacking, the output signals from the buffer memory 4 are subjected to interpolation processing by the interpolation circuit 7 so that the output signals are changed to slow playback signals.

Next, with reference to FIGS. 8A to 8E, there will be described the relationship between pixels and image signals which are written into the buffer memory 4.

(a) During operations for normal imaging at a normal speed, output signals from the solid-state imaging element 11G correspond to the respective pixels in the solid-state imaging element 11G, and the output signals of the successive pixels g11, g12, g13 . . . , are read out therefrom, in order, on a row-by-row basis, as illustrated in FIG. 8A. These signals are written into the buffer memory 4.

(b) On the other hand, during high-speed imaging at a doubled speed, the solid-state imaging element 11G performs pixel addition, which halves the number of pixels in the output signals therefrom corresponding to each row. Therefore, during high-speed imaging, pixel addition is performed on horizontal two pixels, so that signals of discrete sample points as g11, g13, . . . , are written into the buffer memory 4, as shown in FIG. 8B. Further, the signals resulted from pixel addition are expressed by the left pixels out of the combinations of added pixels. For example, the sample point resulted from addition of the pixel g11 and the pixel g12 is expressed as g11. Then, for the G channel, signals of the discrete sample points illustrated in FIG. 8B are written into the buffer memory 4.

(c) Further, in performing pixel addition for the R channel, the combinations of pixels to be added are different from the combinations of pixels to be added for the G channel. Namely, while the pixel addition for the G channel results in a sample point of g11, the pixel addition for the R channel results in a sample point of r12. The r12 is the sample point resulted from adding the signal of the pixel r12 and the signal of the pixel r13. Thus, for the R channel, the signals of the discrete sample points illustrated in FIG. 8C are written into the buffer memory 4.

(d) Assuming that the period of reading out signals of the respective sample points, namely the pixel rate (data rate), is maintained at the same value, the time required for completing the outputting of signals of a first line in the case of performing pixel addition is ½ of that in cases of reading out signals of all the pixels during pixel addition. Namely, in the case of performing pixel addition, it is possible to read out signals of two lines by taking a time period required for reading out 1 line during normal operation. Namely, in the case where signals have 60 frames per second during normal operations, signals having 120 frames per second are written into the buffer memory 4 by performing two-pixel addition.

(e) Next, in outputting from the buffer memory 4, the pixel rate is set to ½ of that during writing as shown in FIGS. 8D and 8E, in order to make the time required for a single line equal to that during normal operations. Namely, signals which have been written as having 120 frames per second are read out as signals having 60 frames per second, thereby providing double-slowed playback signals.

<Problem of Degradation in Resolution Due to Pixel Addition>

The present inventors have found the problem of degradation in resolution due to the decrease of the substantial sampling frequency, since the solid-state imaging elements 11G, 11B and 11R perform pixel addition for adding signals of two pixels to reduce the number of pixels. FIG. 4A is a schematic view illustrating the relationship between signal frequencies and signals before pixel addition. FIG. 4B is a schematic view illustrating the relationship between signal frequencies and signals after pixel addition. Before pixel addition, image signals as illustrated in FIG. 4A are obtained by spatial sampling with the respective pixels in the solid-state imaging element, assuming that the sampling frequency corresponding to the spacing between pixels in the respective solid-state imaging elements is fS0. Further, fN0 equals to fS0/2 and is a Nyquist frequency.

The processing for adding signals of horizontal two pixels is a kind of low pass filtering processing and, as a result thereof, the signal spectrum after the pixel addition is attenuated around the Nyquist frequency fN0, as illustrated in FIG. 4B. Further, the addition of two pixels doubles the spatial sampling interval, which results in a new sampling frequency fS1 equal to fS0/2, thereby inducing the problem of occurrence of a new aliasing component MoG at fS1 in the signal spectrum after the pixel addition, as shown in FIG. 4C.

The imaging apparatus 20 according to the first embodiment makes the combinations of pixels to be added for the G channel different from the combinations of pixels to be added for the R and B channels, in adding horizontal two pixels during the above-described high-speed image capture. As illustrated by broken lines in FIG. 3, for the G channel, signals of horizontal two pixels are added, with the combinations of pixels g11+g12, g13+g14 and g15+g16. On the other hand, for the B channel, pixel addition is performed, with the combinations of pixels b12+b13 and b14+b15. As described above, the combinations of pixels to be added for the B channel are different from those for the G channel. For the R channel, similarly to for the B channel, pixel addition is performed such that the combinations of pixels to be added are different from those for the G channel.

The sample points resulted from the pixel addition have spacing corresponding to two pixels as illustrated by black round marks in FIG. 3, and the positions of the sample points for the G channel are different from the positions of the sample points for the R channel by an amount corresponding to a single pixel. Namely, the sample points resulted from the pixel addition for the G and R channels realize so-called spatial-offset sampling.

Since the combinations of pixels to be added for the G and R channels are different from each other, the sample points resulted from the two-pixel addition for the G and R channels are different from each other by 180 degree. Therefore, the aliasing components for the G and R channels at the new sampling frequency fS1 have opposite phases as illustrated by MoG and MoR in FIG. 4C. Thus, the present inventors have found that the aliasing components at the sampling frequency fS1 can be canceled by adding the signals for the G and R channels. Further, such aliasing components MoG and MoR are included in a high-frequency range around the new sampling frequency fS1.

<Pixel Deviation in Interpolation Processing>

Figure 5:
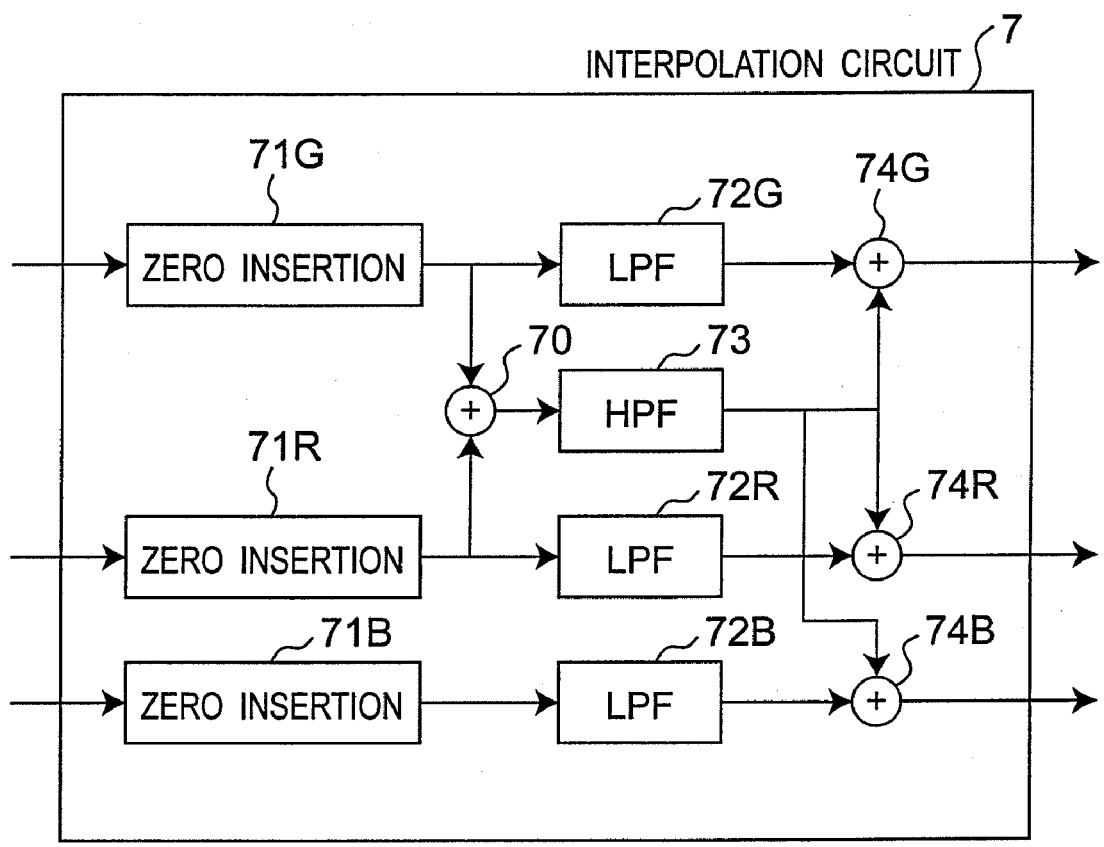
FIG. 5 is a block diagram illustrating an interpolation circuit in the imaging apparatus of FIG. 1.

FIG. 5 is a block diagram illustrating the structure of the interpolation circuit 7. The interpolation circuit 7 performs pixel deviation processing in interpolation operations. At first, a zero (0)-insertion circuit 71G inserts zero "0" to the signals for the G, B and R channels, between sample points resulted from pixel addition, to double the sampling frequency. In this case, the sampling positions for the G channel are different by half cycle from the sampling positions for the R and B channels after the pixel addition and, therefore, their time axes are made coincident with one another through the zero "0" inserting method.

Namely, zero "0" is inserted to the sample points for the R and B channels which correspond to the sample points for the G channel at which signals exist. On the other hand, zero "0" is inserted to the sample points for the G channel which correspond to the sample points for the R and B channels at which signals exist.

From the image signals for the respective channels which have been subjected to the zero "0" insertion, only low-frequency components are extracted through low-pass filters 72G, 72B and 72R. On the other hand, regarding high-frequency components, the signals for the G and R channels, for example, are added by an adder 70, in order to cancel aliasing signals caused by the pixel addition. From the output signals from the adder 70, high-frequency components are extracted by a high-pass filter 73. The high-frequency components can be regarded as common components among all the G, R and B channels. Therefore, the above-described common high-frequency components and the low-frequency components for the respective channels are added by adders 74G, 74B and 74R, thereby providing interpolated signals for the respective channels.

Hereinafter, the interpolation operation by the interpolation circuit 7 will be described, with reference to FIGS. 9A to 9G.

(a) For the G channel, signals of discretely placed sample points resulted from pixel addition performed on horizontal two pixels are output from the buffer memory 4, as illustrated in FIG. 9A.

(b) The zero (0) insertion circuit 71G in the interpolation circuit 7 inserts zero "0" to the signals of FIG. 9A, at every other pixel, thus providing signals illustrated in FIG. 9B.

(c) Subsequently, the signals of FIG. 9B are passed through the low-pass filter 72G to create low-frequency signals which have been interpolated as g12', g14', . . . thus providing signals illustrated in FIG. 9C.

(d) Similarly to for the G channel, for the R channel, signals of discretely placed sample points resulted from pixel addition performed on horizontal two pixels are output from the buffer memory 4, as illustrated in FIG. 9D.

(e) The zero (0) insertion circuit 71R in the interpolation circuit 7 inserts zero "0" to the signals of FIG. 9D, at every other pixel, thus providing signals illustrated in FIG. 9E.

(f) Subsequently, the signals of FIG. 9E are passed through the low-pass filter 72R to create low-frequency signals which have been interpolated as r11', r13', . . . thus providing signals illustrated in FIG. 9F.

(g) The signals of FIG. 9B resulted from the zero (0)-insertion processing by the zero (0)-insertion circuit 71G and the signals of FIG. 9E resulted from the zero (0)-insertion processing by the zero (0)-insertion circuit 71R are added by the adder 70, thus providing signals alternately including data for the G channel and data for the R channel, as illustrated in FIG. 9G.

(h) Only high-frequency components are extracted from the signals of FIG. 9G by the high-pass filter 73. The high-frequency components can be regarded as common components among the respective channels.

(i) The above-described common high-frequency components and the low-frequency components for the respective channels are added, thereby providing signals having less aliasing components for the respective channels.

As described above, absent pixels are interpolated to provide signals of all the pixels per single frame.

As described above, in the imaging apparatus 20, the solid-state imaging elements in the imaging unit 1 add signals of horizontal two pixels, in high-speed image capturing, to suppress the increase of the pixel rate, while realizing a high frame rate. Further, the combinations of pixels to be added for the G channel are made different from the combinations of pixels to be added for the R and B channels for offset-sampling pixels in the interpolation operation, thus providing high-frequency components having suppressed aliasing components. This can suppress the occurrence of aliasing components at the sampling frequency caused by the pixel addition.

Also, it is possible to perform pixel addition in the vertical direction, instead of pixel addition in the horizontal direction. In order to add the signal charges at two pixels adjacent to each other in the vertical direction, for example, it is possible to transfer the signal charges twice in the vertical CCDs within a horizontal blanking period. By applying, twice, a pulse to the transfer electrodes in the vertical CDDs within a horizontal blanking period, it is possible to transfer the signal charges corresponding to two pixels which have read from the photoelectric element into the vertical CCDs within the vertical CCDs. At this time, the signal charges at the last stages in the respective vertical CCDs and the signal charges at the stages previous thereto are continuously transferred to the horizontal CCD and added in the horizontal CCD. On receiving the signal charges corresponding to two lines from the vertical CCDs, the horizontal CCD successively transfers them to the output unit. Since the charges at two pixels adjacent to each other in the vertical direction have been added, the number of times the horizontal transferring should be performed for outputting the signal charges at all the pixels is ½ of that in the case of individually outputting the signal charges at the respective pixels. Accordingly, the time required for outputting the signal charges at all the pixels can be also halved.

In order to capture images at a higher speed, it is possible to add the signal charges at horizontal 2 pixels and vertical 2 pixels, namely at a total of 4 pixels, which makes the number of pixels output from the imaging elements to be ¼ of the original number of pixels, thereby enabling high-speed image capturing at a four times speed.

Further, the imaging elements in the imaging unit are not limited to CCDs. For example, it is also possible to employ CMOS imaging elements capable of outputting digital signals, which can also realize the same effects.

Further, it is possible to perform controls easily in the case where the frame rate in high-speed image capturing is an integral multiple of the frame rate in normal imaging, as in the present embodiment. However, the frame rate in high-speed image capturing is not limited to an integral multiple of the frame rate in normal capturing.

<Imaging Method>

Figure 10:
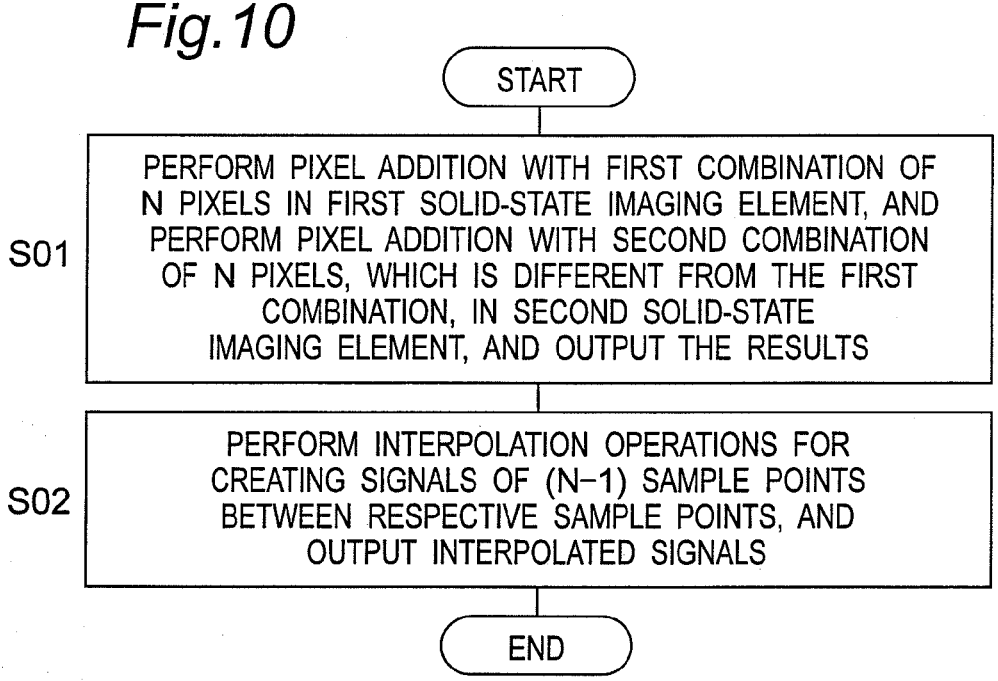
FIG. 10 is a flow chart of an imaging method according to the first embodiment of the present invention.

Next, there will be described an imaging method according to the first embodiment of the present invention. FIG. 10 is a flow chart of the imaging method according to the first embodiment.

(a) Pixel addition is performed in such a way that first combination of N pixels to be added in the first solid-state imaging element are different from second combination of N pixels to be added in the second solid-state imaging element, and the result thereof is output (S01). By performing the pixel addition, it is possible to reduce the number of pixels per single frame, thereby suppressing the data rate while increasing the frame rate. Further, by making the combinations of pixels to be added different from each other, it is possible to deviate the sample points resulted from the pixel addition from each other.

(b) Interpolation operations for creating signals of (N−1) sample points between respective sample points are performed to output interpolated signals (S02). Through the interpolation operations, it is possible to restore the number of pixels which has been reduced through the pixel addition to the original number of pixels. Further, by making the combinations of to-be-added pixels different from each other for providing sample points corresponding to the different pixels as described above, it is possible to suppress the occurrence of aliasing components caused by the pixel addition.

Through the above-described imaging method, it is possible to provide interpolated signals.

<Method for Interpolation Operations>

Figure 11:
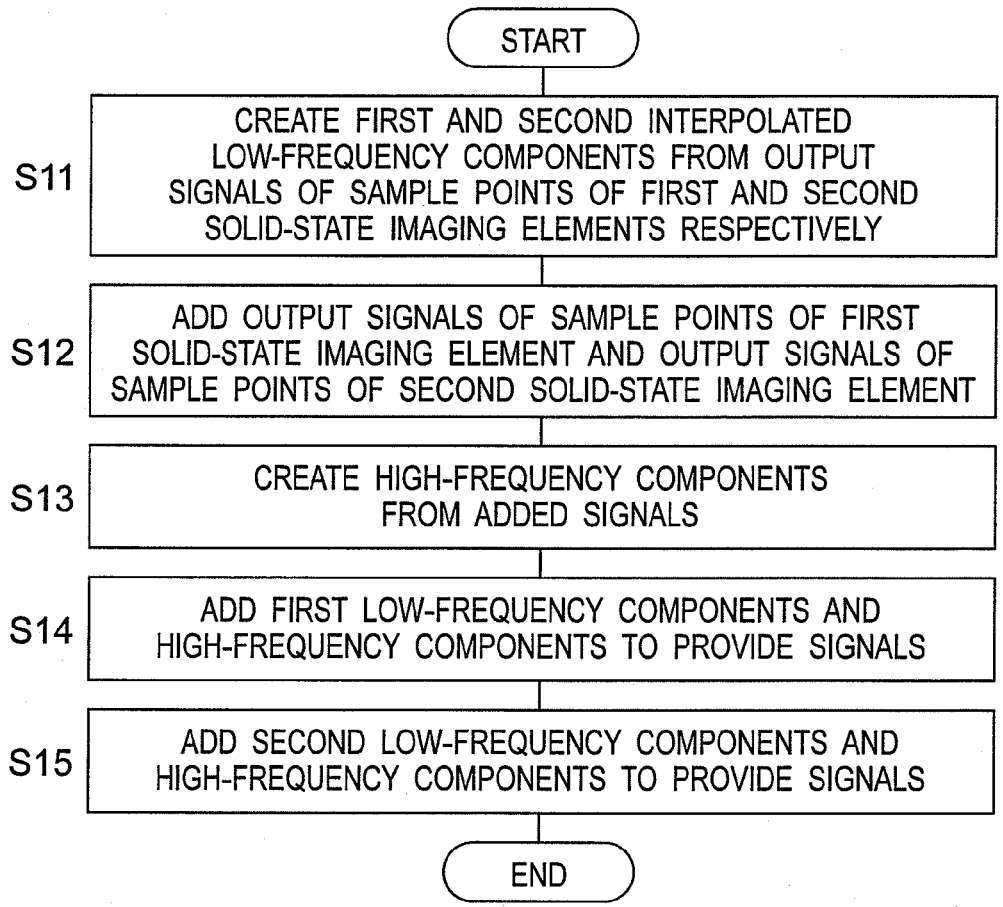
FIG. 11 is a flow chart relating to details of the interpolation operations of FIG. 10.

FIG. 11 is a flow chart illustrating details of the interpolation operations.

(a) From output signals of the sample points of the first and second solid-state imaging elements, first and second interpolated low-frequency components are created, respectively (S11).

(b) The output signals of the sample points of the first solid-state imaging element and the output signals of the sample points of the second solid-state imaging element are added (S12).

(c) High-frequency components are created out of the added signals (S13). The high-frequency components are regarded as common components among the outputs from the respective solid-state imaging elements.

(d) The first low-frequency components and the high-frequency components are added to provide signals for the first solid-state imaging element (S14).

(e) The second low-frequency components and the high-frequency components are added to provide signals for the second solid-state imaging element (S15).

Through the above-described method, it is possible to provide signals which have been subjected to interpolation operations.

Figure 12:
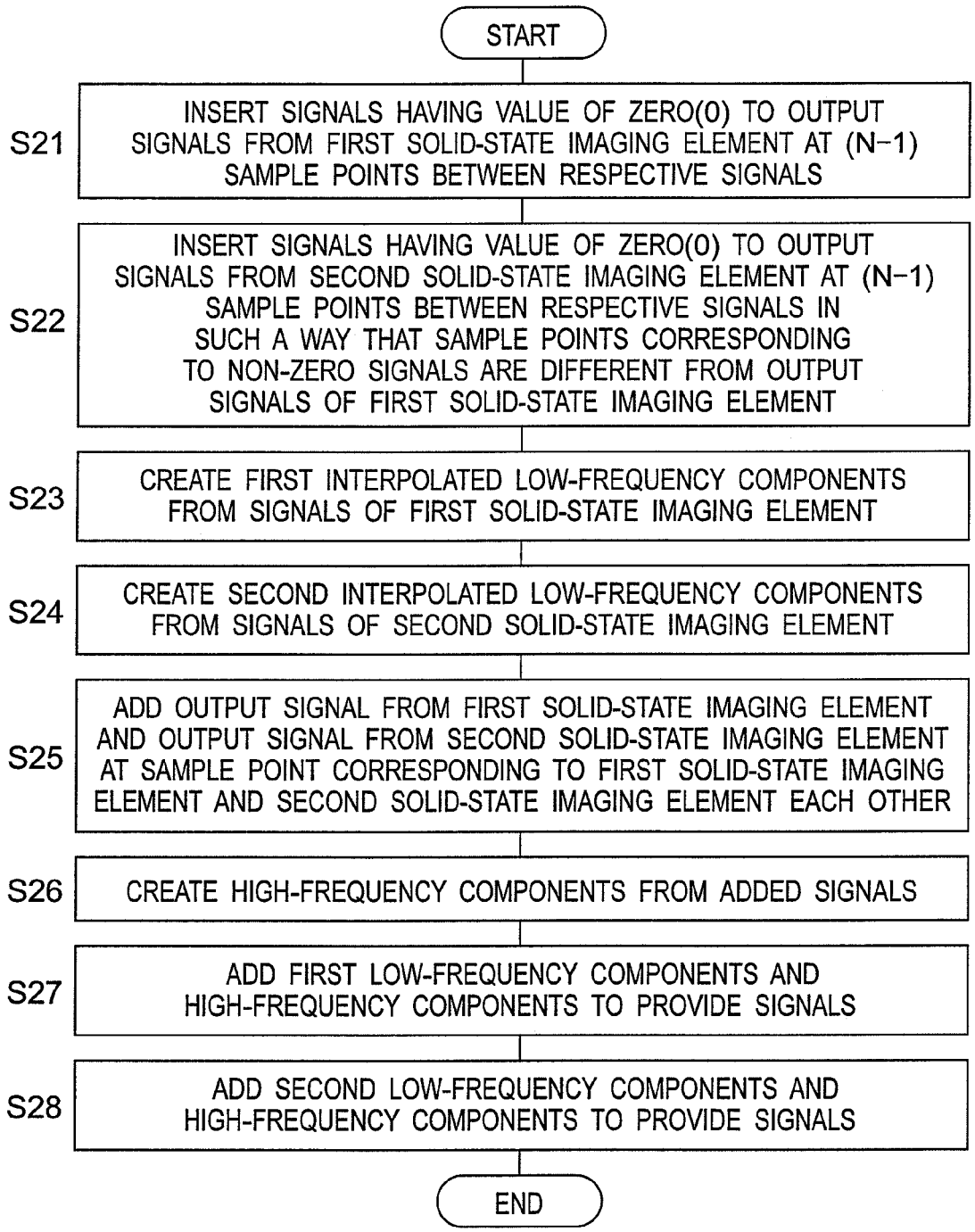
FIG. 12 is a flow chart relating to details of the interpolation operations of FIG. 10 in cases of performing zero (0) insertion.

FIG. 12 is a flow chart of detailed interpolation, in the case of performing zero (0)-insertion processing and adding in such a way as to shift non-zero (0) sample points in the interpolation operations.

(a) Signals having a value of zero (0) are inserted to output signals from the first solid-state imaging element at the (N−1) sample points between signals (S21).

(b) Signals having a value of zero (0) are inserted to output signals from the second solid-state imaging element at the (N−1) sample points between signals in such a way that the sample points corresponding to non-zero (0) signals are different from the output signals from the first solid-state imaging element (S22).

(c) From the signals from the first solid-state imaging element, first interpolated low-frequency components are created (S23).

(d) From the signals from the second solid-state imaging element, second interpolated low-frequency components are created (S24).

(e) The output signals from the first solid-state imaging element and the output signals from the second solid-state imaging element at their sample points corresponding to each other are added (S25).

(f) High-frequency components are created from the added signals (S26).

(g) The first low-frequency components and the high-frequency components are added to provide signals for the first solid-state imaging element (S27).

(h) The second low-frequency components and the high-frequency components are added to provide signals for the second solid-state imaging element (S28).

Through the above-described operations, it is possible to perform zero (0)-insertion processing in interpolation operations to provide interpolated signals.

Second Embodiment

Figure 13:
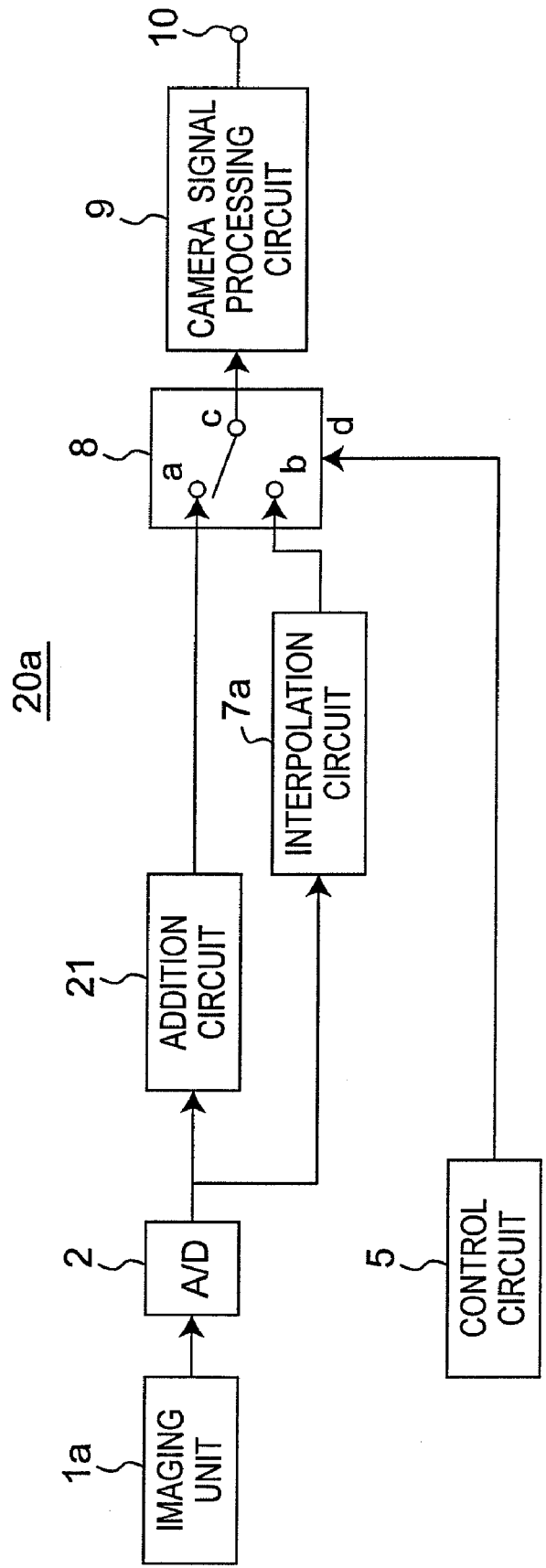
FIG. 13 is a block diagram illustrating the structure of an imaging apparatus according to a second embodiment of the present invention.

FIG. 13 is a block diagram illustrating the structure of an imaging apparatus 20a according to a second embodiment of the present invention. The imaging apparatus 20a includes an imaging unit 1a, an A/D converter 2, a control circuit 5, an interpolation circuit 7a, a selector 8, a camera signal processing circuit 9, an output terminal 10, and an addition circuit 21. The imaging apparatus 20a is different from the imaging apparatus according to the first embodiment, in that the imaging unit 1a employs a four-sensor system for dividing a channel of any color, such as a G channel, into two channels G1 and G2, instead of a three-sensor system. Further, the imaging apparatus 20a is also different therefrom, in that it does not have a frame memory 3 and a buffer memory 4, but has the addition circuit 21.

Figure 14:
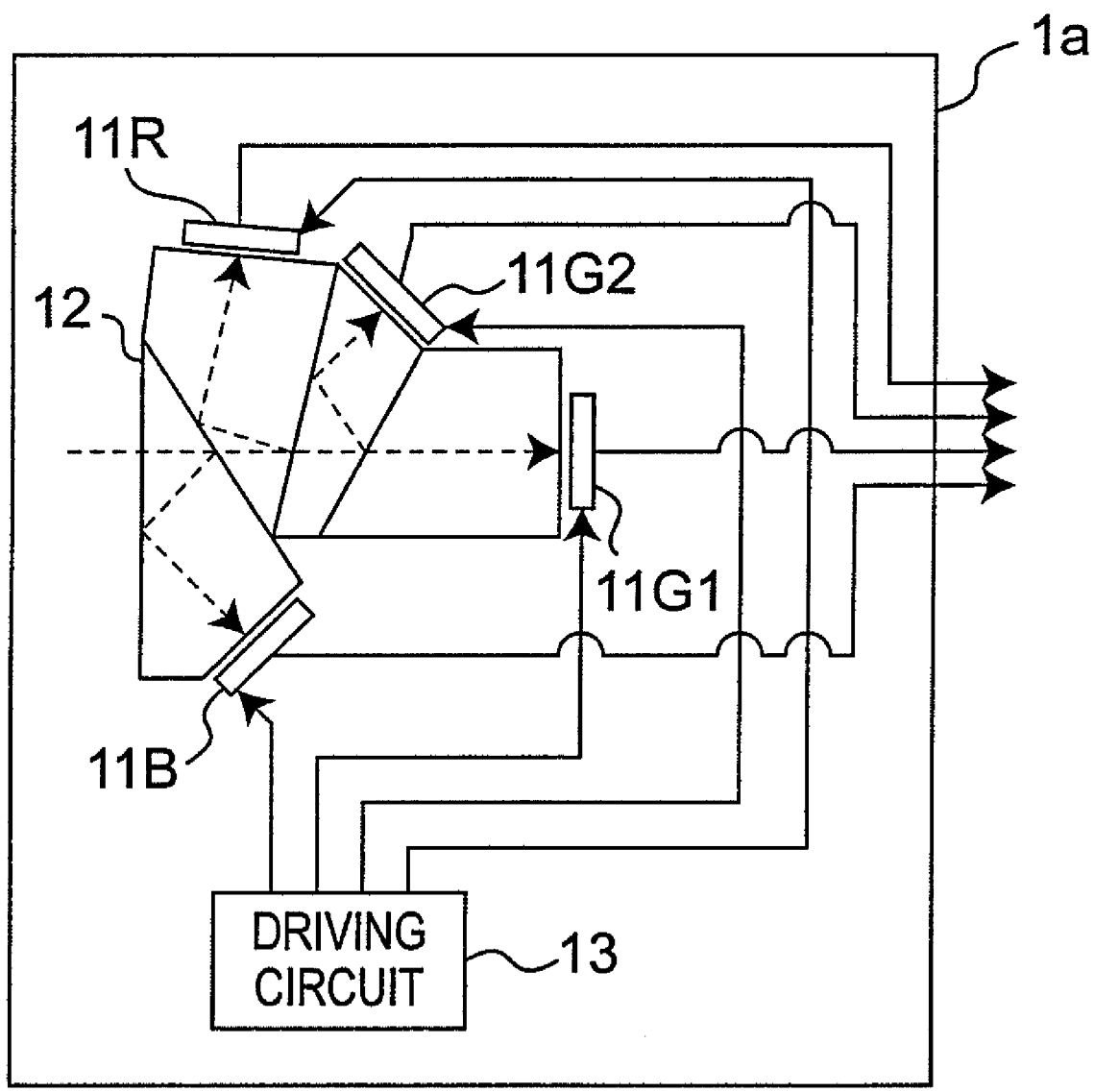
FIG. 14 is a block diagram illustrating the structure of an imaging unit in the imaging apparatus of FIG. 13.

FIG. 14 is a schematic view illustrating the structure of the imaging unit 1a. The imaging unit 1a converts optical image signals into electrical signals and outputs the electrical signals. The imaging system thereof is a four-sensor system constituted by four solid-state imaging elements, unlike the imaging unit in the imaging apparatus according to the first embodiment. The imaging unit 1a divides light inputted from a lens (not illustrated) into respective colors through an optical prism 12 and forms images in the respective solid-state imaging elements 11R, 11G1, 11G2 and 11B. The optical prism 12 is constituted by four glass blocks and has multiple thin films deposited on the interface surfaces therebetween, in order to reflect light with a certain wavelength while passing light with the remaining wavelengths therethrough. Namely, a blue (B) component out of incident light is reflected by the first deposited surface, while the remaining components are passed therethrough. A red (R) component is reflected by the second deposited surface, while the remaining components are passed therethrough. The third deposited surface has a half mirror having no wavelength selectivity and reflects a half of a green component while passing the remaining half thereof therethrough.

Figure 15:
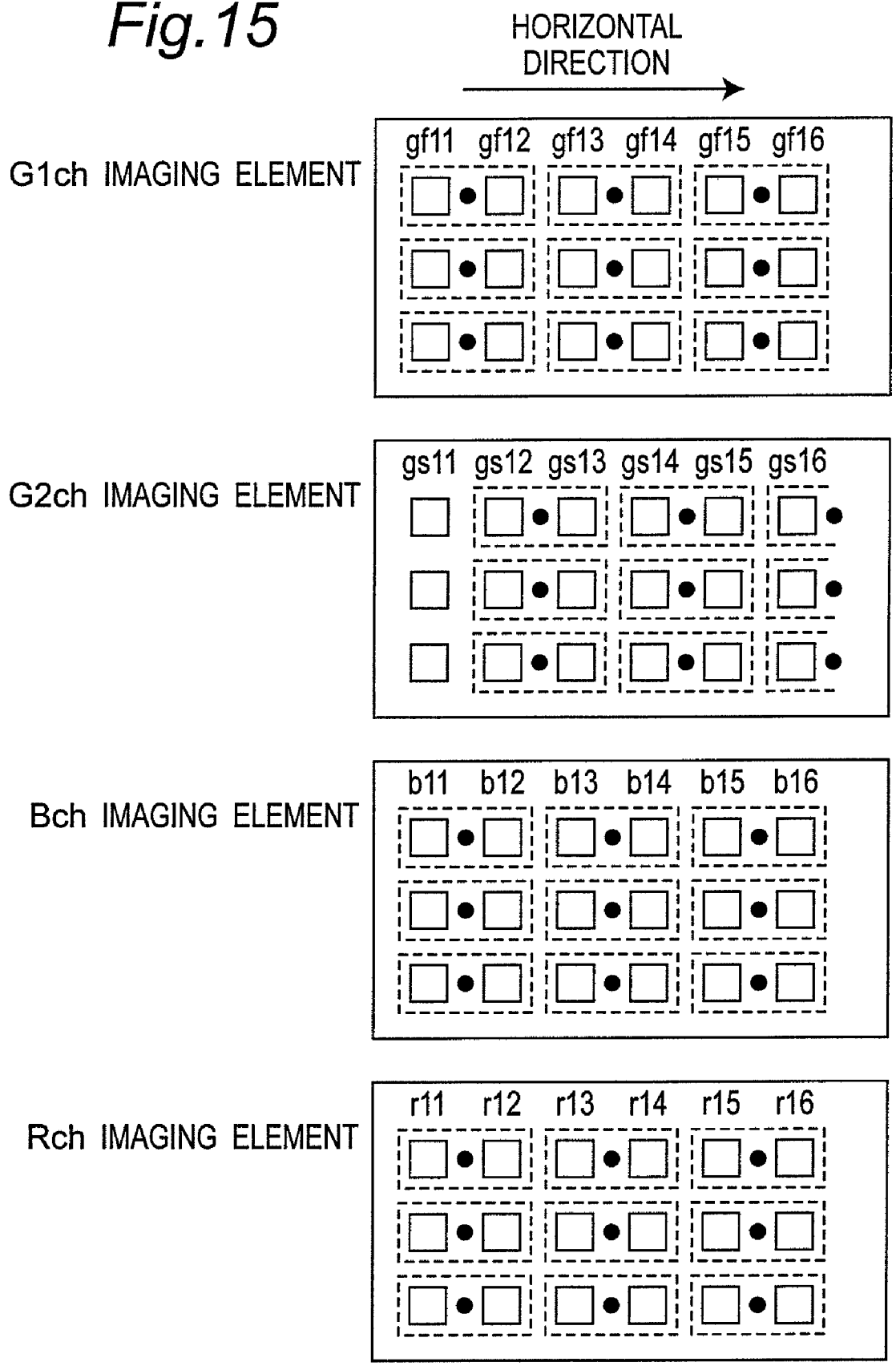
FIG. 15 is a schematic view illustrating the combinations of pixels to be added in four solid-state imaging elements in the imaging unit of FIG. 14.

The solid-state imaging elements 11G1 and 11G2 correspond to the G channel, while the solid-state imaging elements 11B and 11R correspond to the B and R channels, respectively. They are, for example, CCD image sensors, have a discrete pixel structure and spatially sample images and convert them into electrical signals. Further, the solid-state imaging elements 11G1, 11G2, 11B and 11R are driven by a driving circuit 13. Further, as illustrated in FIG. 15, the placements of pixels in all the four solid-state imaging elements 11G1, 11G2, 11B and 11R correspond to the same positions optically. Namely, incident light is divided into four optical signals through the optical prism 12, and the four optical signals form images in the four solid-state imaging elements 11G1, 11G2, 11B and 11R, and pixels gf11, gs11, b11 and r11 in FIG. 15 sample optically the same position. Four imaging signals G1, G2, B and R are created as output signals, in association with the solid-state imaging elements 11G1, 11G2, 11B and 11R in the imaging unit 1a.

<Pixel Addition>

In the imaging apparatus 20a, in performing high-speed imaging, similarly to in the first embodiment, the solid-state imaging elements 11G1, 11G2, 11B and 11R in the imaging unit 1a add the signal charges at two pixels and output the added signal charges. For example, by adding the signal charges at horizontal two pixels, it is possible to halve the number of pixels output from the solid-state imaging elements, which can halve the time required for outputting them, even when the solid-state imaging elements are driven through the same driving clock speed as a normal driving clock. Thus, even if the frame rate is doubled, it is possible to maintain the rate of signals from the solid-state imaging elements 11G1, 11G2, 11B and 11R (the data rate) equal to that during capturing images at a normal frame rate.

<Combinations of Pixels to be Added>

The imaging apparatus 20a according to the second embodiment makes the combinations of pixels for the G1 channel different from the combinations of pixels for the G2 channel, for the addition horizontal two pixels. Namely, as illustrated by broken lines in FIG. 15, for the G1 channel, signals of horizontal two pixels are added with the combinations of pixels gf11+gf12, gf13+gf14 and gf15+gf16. On the other hand, for the G2 channel, the combinations of pixels to be added are different therefrom, such that the combinations of pixels to be added are gs12+gs13 and gs14+gs15. For the R and B channels, pixel addition is performed with the same combinations of pixels as those for the G1 channel.

The sample points resulted from the pixel addition have spacing corresponding to two pixels as illustrated by black round marks in FIG. 15, and the positions of the sample points for the G1 channel are different from the positions of the sample points for the G2 channel by an amount corresponding to a single pixel. Namely, the sample points resulted from the pixel addition for the G1 and G2 channels realize so-called spatial-offset sampling. Therefore, by combining signals for the G1 channel and the G2 channel on each other, even though the pixel addition is performed, it is possible to provide the same number of horizontal pixels as that before the pixel addition. This corresponds to canceling aliasing components caused by two-pixel addition, similarly to in the first embodiment. Particularly, in the present second embodiment, G signals and G signals are added such that their pixels are offset-placed from each other, which can completely cancel aliasing components.

Next, there will be described operations of the imaging apparatus according to the present embodiment, with reference to FIG. 13.

<Operations for Normal Imaging>

At first, operations for normal imaging at a normal speed will be described. In FIG. 13, the A/D converter 2 converts output signals from the imaging unit 1a into digital imaging signals and inputs the digital imaging signals to the addition circuit 21. The addition circuit 21 adds signals G1 and G2 for the two G channels at the respective sample points to create G signals. As described with reference to FIG. 15, the sample points in the solid-state imaging elements 11G1 and 11G2 for the two G channels correspond to each other. Accordingly, by adding the signals, the amount of signals is doubled. The two solid-state imaging elements share the components for the G channel, which can double the maximum saturation signal level, thereby increasing the dynamic range. On the other hand, the signals for the R channel and the B channel are directly output. During normal imaging at a normal speed, the control circuit 5 selects input signals from the contact point a in the selector 8, so that outputs from the addition circuit 21 are output from the contact point c, then are subjected to various signal processing by the camera signal processing circuit 9 and then are output from the output terminal 10.

<Operations for High-Speed Imaging>

Next, there will be described cases of performing high-speed imaging at a speed rate of ½ for slow-motion images with respect to a normal speed, namely at a double speed. In high-speed imaging at a double speed, image signals having 120 frames per second are output from the imaging unit 1a, unlike 60 frames per second in normal imaging. However, as described above, the respective solid-state imaging elements in the imaging unit 1a perform pixel addition on a 2-pixel-by-2-pixel basis in the horizontal direction, thereby halving the number of output samples per single frame. The A/D converter 2 converts output signals from the imaging unit 1a into digital imaging signals and inputs the digital imaging signals to the interpolation circuit 7a. Further, the signals output from the imaging unit 1a have a frame rate which is double of the frame rate during normal imaging, but has the same pixel rate as the pixel rate during normal imaging. Further, the sampling frequency of the A/D converter 2 is the same as the sampling frequency during normal imaging.

Figure 16:
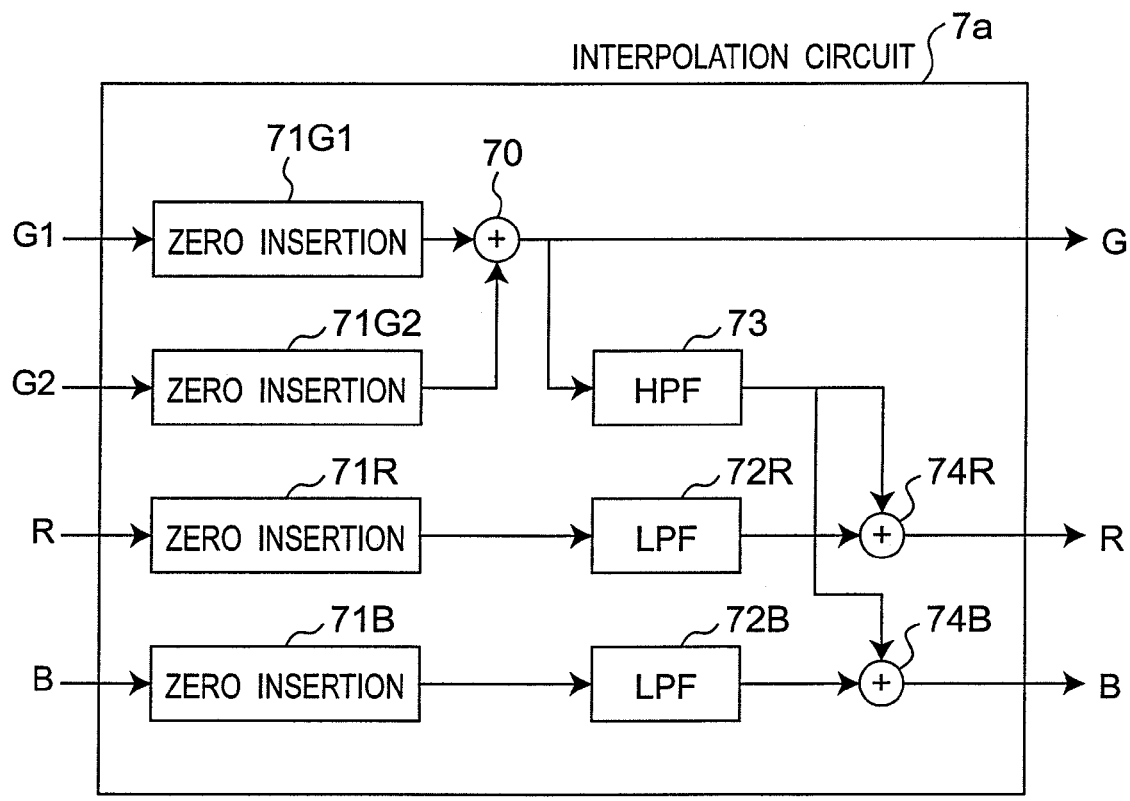
FIG. 16 is a block diagram illustrating the structure of an interpolation circuit in the imaging apparatus of FIG. 13.

FIG. 16 is a block diagram illustrating the structure of the interpolation circuit 7a. In the interpolation circuit 7a, at first, zero (0)-insertion circuits 71G1, 71G2, 71R and 71B insert zero "0" to the input signals for the G1, G2, B and R channels, at every other pixel, thereby doubling the pixel rate. However, as described above, the sample points for the G1 channel are different by half cycle from the sample points for the G2 channel after the pixel addition and, therefore, zero "0" is inserted thereto in such a way as to make their time axes coincident with each other after the zero "0" insertion. Namely, zero "0" is inserted to the sample points for the G2 channel which correspond to the sample points for the G1 channel at which signals exist. On the other hand, zero "0" is inserted to the sample points for the G1 channel which correspond to the sample points for the G2 channel at which signals exist. Further, the sample points for the B and R channels which have been resulted from pixel addition correspond to the sample points for the G1 channel and, accordingly, zero "0" is inserted between respective sample points for the B and G channels in the same way as that for the G1 channel.

The signals for the G1 channel and the signals for the G2 channel are added by the adder 70, after being subjected to the above-described zero (0)-insertion processing. The signals resulted from the zero "0" insertion processing alternately include zero "0s" and signals and, as described above, the sample points for the G1 channel at which signals exist are different from the sample points for the G2 channel at which signals exist. Accordingly, the signals resulted from the addition of the signals for the G1 channel and the signals for the G2 channel equal to signals created by alternately selecting the signals for the G1 channel and the signals for the G2 channel. The outputs of the adder 70 become output signals for the G channel from the interpolation circuit 7a. Further, from the outputs from the adder 70, only high-frequency signals are extracted by the high-pass filter 73.

On the other hand, low-pass filters 72B and 72R extract only low-frequency components, from the signals for the B and R channels. Then, an adder 74B and an adder 74R add the output signals from the high-pass filter 73 thereto to create output signals for the B and R channels. Namely, the high-frequency signals as G signals from which aliasing signals have been canceled can be regarded as signals in common with the high-frequency signals for the B and R channels. Therefore, the common high-frequency signals are added to the low-frequency components for the B and R channels, thereby providing interpolated signals for the B and R channels. Thus, in high-speed imaging, image signals which have been subjected to pixel addition by the imaging unit 1a to halve the number of pixels therein are interpolated by the interpolation circuit 7a, so that the image signals are changed to signals having the same number of sample points as the number of sample points during normal imaging and then are output. Further, the frame rate is made double of a normal frame rate, thereby making the pixel rate double of a normal pixel rate.

The control circuit 5 selects input signals from the contact point b in the selector 8, so that the input signals are output from the contact point c. Thus, the output signals from the interpolation circuit 7a are subjected to various signal processing by the camera signal processing circuit 9 and then are output as double-speed imaging signals from the output terminal 10. A recording device, such as a semiconductor memory, a hard disk device or a VTR, is connected to the output terminal 10, in order to record the double-speed imaging signals. By playbacking the recorded signals at a normal frame rate, it is possible to provide double-slowed playback signals.

As described above, in high-speed image capturing, the solid-state imaging elements add signals, thereby suppressing the increase of the pixel rate. Further, the combinations of pixels to be added for the G1 channel are made different from the combinations of pixels to be added for the G2 channel. By adding the signals for the G1 channel and the G2 channel which have been resulted from the pixel addition, it is possible to suppress the occurrence of aliasing components at the Nyquist frequency.

Although, in the above-described examples, there have been described cases where two pixels are added in the horizontal direction, it is also possible to perform pixel addition in the vertical direction, as another aspect. In such a case, it is also possible to offer the effect of making the frame rate double of a normal frame rate. Further, in this case, the interpolation circuit 7 is required to perform operations for zero "0" insertion in the vertical direction, and also the low-pass filters 72B and 72R and the high-pass filter 73 are required to perform vertical filtering operations as filtering operations.

Further, although the two-pixel addition method has been described with reference to FIG. 15 as a method for halving the number of signal samples during high-speed imaging, there is also a method illustrated in FIG. 17, as another method. This method uses only a single pixel, out of each two pixels in the horizontal direction, while discarding the other single pixel and not using it as signals. For example, in FIG. 17, black round marks designate pixels to be used as signals, while cross marks designate pixels which are not to be used. The signal charges at the unnecessary pixels designated by the cross marks can be discharged through, for example, electronic shutter operations. The method illustrated in FIG. 17 has the drawback of reducing the sensitivity to ½ of the sensitivity in the case of adding signal charges through pixel addition since the signals of half of the pixels are not used, but has the advantage of involving no degradation in frequency characteristics in the horizontal direction since it performs no pixel addition.

Third Embodiment

Figure 18:
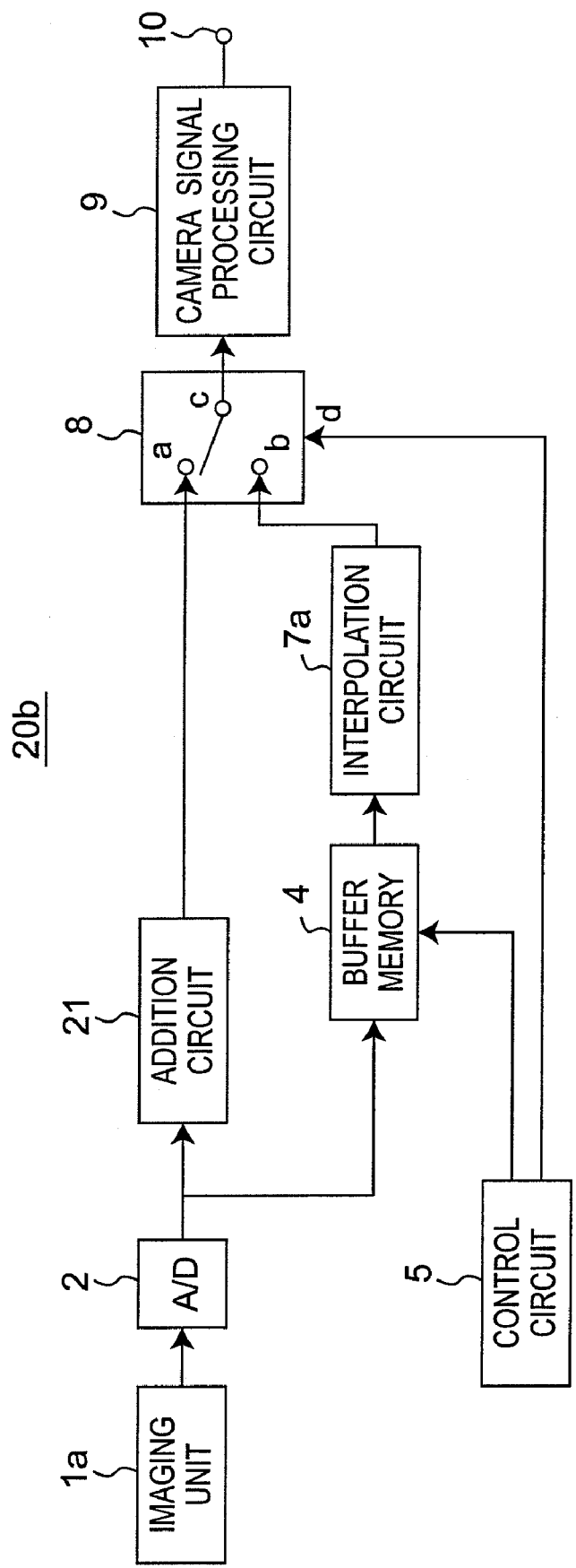
FIG. 18 is a block diagram illustrating the structure of an imaging apparatus according to a third embodiment of the present invention.

FIG. 18 is a block diagram illustrating the structure of an imaging apparatus 20b according to a third embodiment of the present invention. The imaging apparatus 20b includes an imaging unit 1a, an A/D converter 2, a buffer memory 4, a control circuit 5, an interpolation circuit 7a, a selector 8, a camera signal processing circuit 9, an output terminal 10, and an addition circuit 21. The imaging apparatus 20b is different from the imaging apparatus according to the second embodiment, in that it includes the buffer memory 4. Operations of the imaging apparatus 20b will be described with reference to FIG. 18 as required, but description of the same components as those in FIG. 13 will be partially omitted.

The imaging unit 1a has a structure of a four-sensor imaging system, similarly to in the second embodiment, and also performs pixel addition in high-speed imaging similarly thereto and, therefore, the description thereof is eliminated.

Further, the operations thereof in normal imaging at a normal speed are also completely the same as those in the second embodiment and are not described therein.

Next, there will be described cases of performing high-speed imaging at a speed rate of ½ for slow-motion images, namely at a double speed, for example, regarding high-speed imaging and slow-motion playback.

<Operations for High-Speed Imaging>

At first, in high-speed imaging, the imaging unit 1a performs pixel addition on each two pixels in the horizontal direction and outputs imaging signals having 120 frames per second and having a number of output samples which is ½ of the original number of output samples, similarly to in the second embodiment. The output signals from the imaging unit 1a are converted into digital imaging signals by the A/D converter 2, and the digital imaging signals are written into the buffer memory 4. In the present embodiment, the buffer memory 4 is utilized as a buffer for use in slow-motion playback. Namely, the imaging signals created by high-speed imaging which are to be slow-playbacked are temporarily stored in the buffer memory 4.

<Operations for Slow-Motion Playback>

Subsequently, the operations for slow-motion playback will be described. Slow-motion playback is performed by slowly reading out imaging signals which have been written into the buffer memory 4. Namely, although imaging signals having 120 frames per second have been written into the buffer memory 4, 60 frames are read out therefrom per second by taking a double time, during slow-motion playback. The playback signals from the buffer memory 4 are inputted to the interpolation circuit 7a. The control circuit 5 selects input signals from the contact point b in the selector 8 so that the input signals are output from the contact point c. The output signals from the interpolation circuit 7a are subjected to various signal processing by the camera signal processing circuit 9 and then are output from the output terminal 10. The output signals from the buffer memory 4 are imaging signals having 60 frames per second and having a number of pixels per single frame which is ½ of the original number of pixels. The interpolation circuit 7a performs the same operations as those in the second embodiment on these output signals to perform operations for interpolating absent sample points therein, which causes the output signals to have the same number of sample points as that during high-speed imaging. As described above, by using the buffer memory 4 for recording and playback, it is possible to provide double-slowed playback signals from the output terminal 10.

As described above, in high-speed imaging, the solid-state imaging elements perform pixel addition for adding signals, which can suppress the increase of the pixel rate. Further, the combinations of pixels to be added for the G1 channel are made different from the combinations of pixels to be added for the G2 channel, which can provide imaging signals having less aliasing components. Further, since the buffer memory 4 is provided, it is possible to perform slow-motion playback without requiring an external storage device, such as a semi-conductor memory or a hard disk device.

Further, in the above-described description, imaging signals are written into the buffer memory 4 in high-speed imaging, which makes it impossible to monitor images during capturing them. Therefore, it is possible to employ, as the buffer memory 4, a memory which enables writing thereto and reading therefrom concurrently, such as a dual-port type memory, in order to overcome the problem. Namely, by reading out image signals in such a way as to eliminate a single frame out of each 2 frames by taking a double time, while writing imaging signals having 120 frames per second into the buffer memory 4, it is possible to output imaging signals having 60 frames per second.

Figure 19:
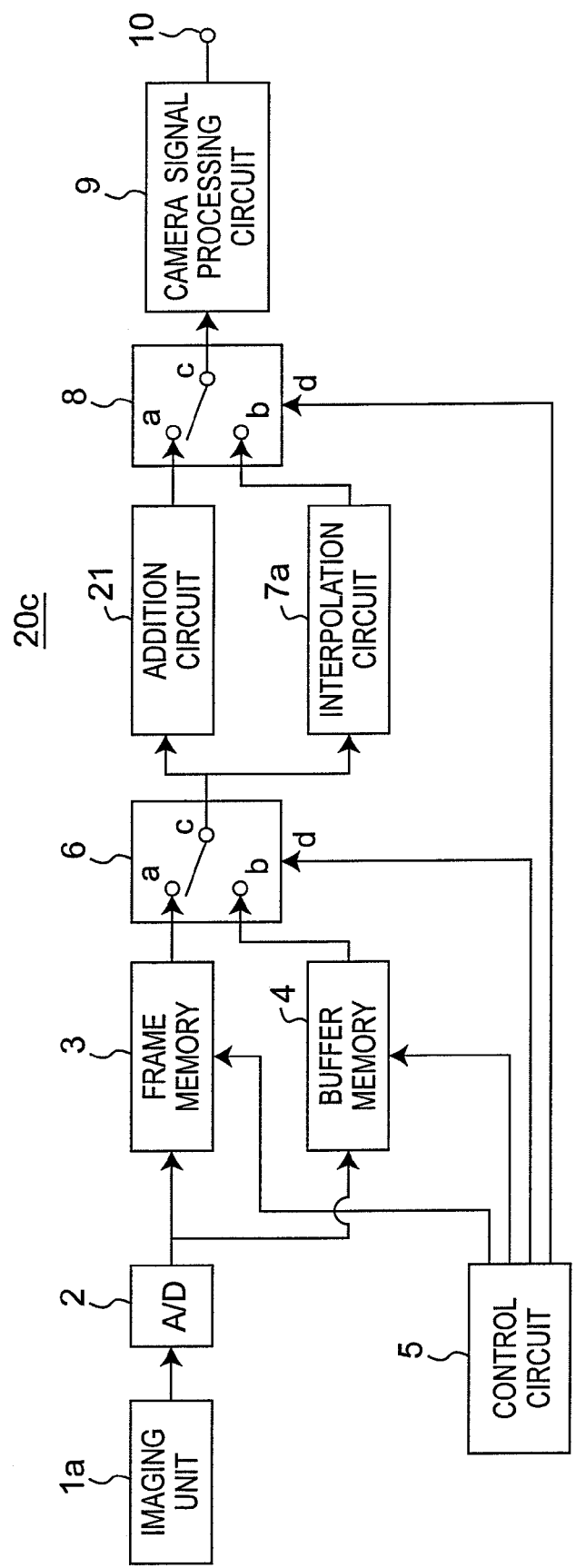
FIG. 19 is a block diagram illustrating the structure of an imaging apparatus as another example.
Figure 20:
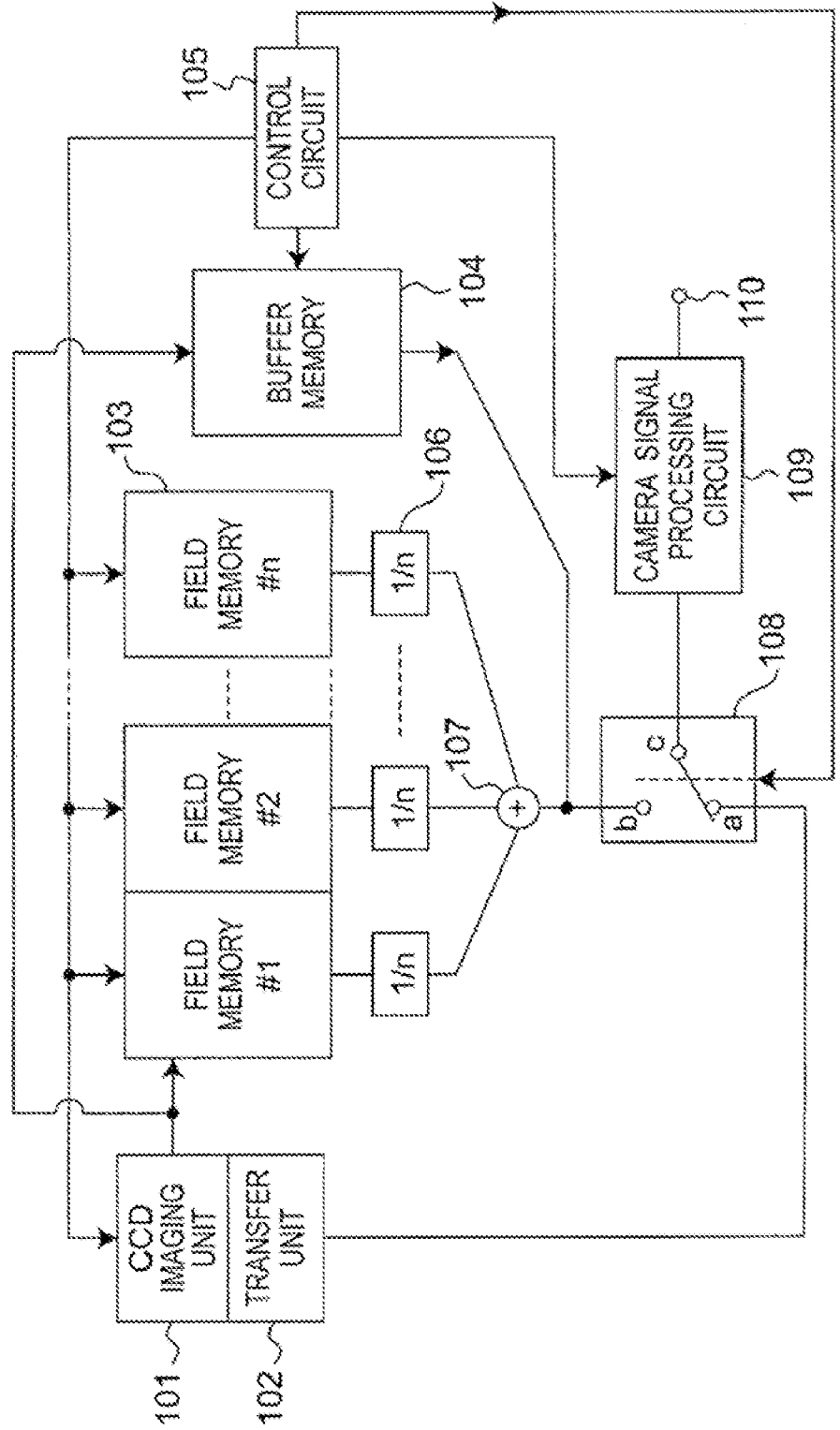
FIG. 20 is a block diagram illustrating the structure of a conventional imaging apparatus.

Also, as another method, a frame memory 3 can be added to the structure of the imaging apparatus 20c as illustrated in FIG. 19, similarly to in the first embodiment. In this case, the buffer memory 4 is used only for recording high-speed imaging signals, while the frame memory 3 is used for monitoring during high-speed capturing. Namely, in high-speed capturing, the contact point a in the selector 6 is selected while the contact point b in the selector 8 is selected, so that image signals having 120 frames per second are written into the frame memory 3, while image signals are read out therefrom in such a way as to eliminate a single frame out of each two frames by taking a double time, and signals of absent sample points are provided by the interpolation circuit 7a, which enables outputting monitoring imaging signals having 60 frames per second.

The imaging apparatus according to the present invention can be effectively used as a high-speed imaging apparatus such as a video camera which is capable of realizing beautiful slow-motion playback.

The invention claimed is:

1. An imaging apparatus, comprising:
an imaging unit including at least a first solid-state imaging element and a second solid-state imaging element, each solid-state imaging element having a same discrete pixel structure of a frame including a first number M of pixels, the imaging unit being configured to:
1) perform normal imaging and high-speed imaging,
2) output directly imaging signals of a first number M of pixel data from the first solid-state imaging element and the second solid-state imaging element during normal imaging, and
3) mix a second number N of pixel data of the first number M of pixel data to form a third number of pixel data on the first solid-state imaging element and the second solid-state imaging element, the third number being equal to the first number M divided by the second number N (M/N, wherein M and N are integers equal to or greater than 2), and output the imaging signals of the third number of pixel data during high-speed imaging,
wherein a first combination of the second number N pixel data to be mixed by the first solid-state imaging element is different from a second combination of the second number N pixel data to be mixed by the second solid-state imaging element;
an operation unit configured to output directly the imaging signals of the first number M of pixel data from the imaging unit during the normal imaging, and configured to interpolate (N−1) pixel data between respective pixel data of the imaging signals from the imaging unit and output interpolated signals of the first number M of pixel data during high-speed imaging, and
a storage unit disposed between the imaging unit and the operation unit configured to store the imaging signals output from the imaging unit and output the stored imaging signals to the operation unit,
wherein the operation unit performs operations on the stored imaging signals output from the storage unit.

2. The imaging apparatus according to claim 1, wherein during interpolation, the operation unit is configured to:
1) create first interpolated low-frequency components from the imaging signals output from the first solid-state imaging element,
2) create second interpolated low-frequency components from the imaging signals output from the second solid-state imaging element,
3) add the imaging signals output from the first solid-state imaging element and the imaging signals output from the second solid-state imaging element and create high-frequency components of the added imaging signals,
4) add the first interpolated low-frequency components and the high-frequency components to provide processed signals for the first solid-state imaging element, and
5) add the second interpolated low-frequency components and the high-frequency components to provide processed signals for the second solid-state imaging element.

3. The imaging apparatus according to claim 1, wherein during interpolation operations, the operation unit is configured to:
1) insert (N−1) pixel data having a value of zero (0) between two pixel data of the M/N pixel data of the imaging signals output from the first solid-state imaging element to provide the M pixel data,
2) insert (N−1) pixel data having a value of zero (0) between two pixel data of the M/N pixel data of the imaging signals output from the second solid-state imaging element in such a way that a sample point having pixel data of non-zero (0) is different from a sample point having pixel data of non-zero (0) of the imaging signals output from the first solid-state imaging element to provide the M pixel data,
3) create first interpolated low-frequency components from the imaging signals of the first solid-state imaging element,
4) create second interpolated low-frequency components from the imaging signals of the second solid-state imaging element,
5) add the imaging signals output from the first solid-state imaging element and the imaging signals output from the second solid-state imaging element at sample points corresponding to each other, and create high-frequency components of the added imaging signals,
6) add the first interpolated low-frequency components and the high-frequency components to provide processed signals for the first solid-state imaging element, and
7) add the second interpolated low-frequency components and the high-frequency components to provide processed signals for the second solid-state imaging element.

4. The imaging apparatus according to claim 1, wherein the imaging unit further comprises:
a third solid-state imaging element having a discrete pixel structure of a frame including a second number M of pixels,
wherein during interpolation operations, the operation unit is configured to:
1) create third interpolated low-frequency components from imaging signals output from the third solid-state imaging elements,
2) add the imaging signals output from the first solid-state imaging element and the imaging signals output from the second solid-state imaging element, and create high-frequency components of the added imaging signals, and
3) add the third interpolated low-frequency components and the high-frequency components to provide processed signals for the third solid-state imaging element.

5. The imaging apparatus according to claim 4, wherein the first and second solid-state imaging elements correspond to G1 and G2 channels provided by dividing a G channel into two channels,
the third solid-state imaging element corresponds to a B channel,
wherein the imaging unit further comprises a fourth solid-state imaging element corresponding to an R channel,
wherein imaging signals output from the first and second solid-state imaging elements corresponding to the G1 channel and the G2 channel are added to provide processed signals for the G channel during normal imaging, and
wherein during high-speed imaging, the operation unit is configured to:
1) add the imaging signals output from the first solid-state imaging elements and the imaging signals output from the second solid-state imaging element to provide processed signals for the G channel,
2) create high-frequency component from the imaging signals for the G channel, 3) create third interpolated low-frequency components from imaging signals output from the third solid-state imaging elements,
4) create fourth interpolated low-frequency components form imaging signals output from the fourth solid-state imaging elements,
5) add the third interpolated low-frequency components and the high-frequency components to provide processed signals for the third solid-state imaging element, and
6) add the fourth interpolated low-frequency components and the high-frequency components to provide processed signals for the fourth solid-state imaging element.

6. The imaging apparatus according to claim 1, wherein the imaging unit further comprises:
a third solid-state imaging element having a discrete pixel structure of a frame including a second number M of pixels,
wherein during interpolation operations, the operation unit is configured to:
1) insert (N−1) pixel data having a value of zero (0) between two pixel data of the M/N pixel data of the imaging signals output from the first solid-state imaging element to provide M pixel data,
2) insert signals (N−1) pixel data having a value of zero (0) between two pixel data of the M/N pixel data of the imaging signals output from the second solid-state imaging element in such a way that a sample point having pixel data of non-zero (0) is different from a sample point having pixel data of non-zero (0) of the imaging signals output from the first solid-state imaging element to provide M pixel data,
3) insert (N−1) pixel data having a value of zero (0) between two pixel data of the M/N pixel data of the imaging signals output from the third solid-state imaging element in such a way that a sample point having pixel data of non-zero (0) is different from a sample point having pixel data of non-zero (0) of the imaging signals output from the first solid-state imaging element to provide M pixel data,
4) create third interpolated low-frequency components from the imaging signals of the third solid-state imaging element,
5) add the imaging signals output from the first solid-state imaging element and the imaging signals output from the second solid-state imaging element at sample points corresponding to each other, and create high-frequency components of the added imaging signals, and
6) add the third interpolated low-frequency components and the high-frequency components to provide processed signals for the third solid-state imaging element.

7. The imaging apparatus according to claim 1, wherein the first and second solid-state imaging elements correspond to two channels selected form Green(G), Blue(B), and Red(R) channels.

8. The imaging apparatus according to claim 1, wherein the imaging unit outputs a frame rate greater than a frame rate output from the storage unit.

* * * * *